US007043091B2

(12) United States Patent
Michel

(10) Patent No.: US 7,043,091 B2
(45) Date of Patent: May 9, 2006

(54) METHOD AND APPARATUS FOR INCREASING SPATIAL RESOLUTION OF AN IMAGE

(75) Inventor: Xavier Michel, Chiba (JP)

(73) Assignee: Sony Corporation, (JP)

( * ) Notice: Subject to any disclaimer, the term of this patent is extended or adjusted under 35 U.S.C. 154(b) by 680 days.

(21) Appl. No.: 09/933,822

(22) Filed: Aug. 22, 2001

(65) Prior Publication Data

US 2002/0028028 A1 Mar. 7, 2002

(30) Foreign Application Priority Data

Aug. 23, 2000 (JP) ............................ P2000-251968

(51) Int. Cl.
*G06K 9/44* (2006.01)
(52) U.S. Cl. ........................ 382/266; 382/299; 382/300
(58) Field of Classification Search ................ 382/299, 382/200, 266, 300
See application file for complete search history.

(56) References Cited

U.S. PATENT DOCUMENTS

| 4,985,764 | A | * | 1/1991 | Sato ............................. 348/448 |
| 5,019,903 | A | * | 5/1991 | Dougall et al. .............. 348/448 |
| 5,054,100 | A | * | 10/1991 | Tai .............................. 382/300 |
| 5,229,864 | A | * | 7/1993 | Moronaga et al. ........... 382/261 |
| 5,450,531 | A | * | 9/1995 | Ng et al. ...................... 382/266 |
| 5,513,281 | A | * | 4/1996 | Yamashita et al. .......... 382/278 |
| 6,219,464 | B1 | * | 4/2001 | Greggain et al. ............ 382/298 |
| 6,535,651 | B1 | * | 3/2003 | Aoyama et al. ............. 382/300 |
| 6,741,751 | B1 | * | 5/2004 | Klassen ....................... 382/266 |
| 2002/0006231 | A1 | * | 1/2002 | Jayant et al. ................ 382/266 |

OTHER PUBLICATIONS

John C. Russ, "The Image Processing Handbook", Second Edition, pp. 236-237, 1995.*

* cited by examiner

*Primary Examiner*—Joseph Mancuso
*Assistant Examiner*—Patrick Edwards
(74) *Attorney, Agent, or Firm*—Rader, Fishman & Grauer PLLC; Ronald P. Kananen

(57) ABSTRACT

The resolution of an image is converted effectively using a simple process which needs a small amount of calculation. Local energy is determined from the differences between pixel values of N pixels lying at diagonal locations in an upper and lower rows. When the local energy is greater than a threshold value, a diagonal line given by two pixels having the smallest difference is employed as an edge direction. An image is interpolated between the two pixels in the edge direction by employing the mean value of the two pixel values of those two pixels. Thereafter, it is determined whether consistency is achieved between the interpolated image and the upper and lower pixels. If consistency is not achieved, linear interpolation is performed as in the case where the energy is lower than the threshold value.

13 Claims, 36 Drawing Sheets

FIG. 16

| $\left(\dfrac{1}{4} - \dfrac{\alpha}{2}\right)^2$ | $\dfrac{1}{16} - \dfrac{\alpha}{8}$ | $\dfrac{\alpha}{4} - \dfrac{\alpha^2}{2}$ | $\dfrac{1}{16} - \dfrac{\alpha}{8}$ | $\left(\dfrac{1}{4} - \dfrac{\alpha}{2}\right)^2$ |
|---|---|---|---|---|
| $\dfrac{1}{16} - \dfrac{\alpha}{8}$ | $\dfrac{1}{16}$ | $\dfrac{\alpha}{4}$ | $\dfrac{1}{16}$ | $\dfrac{1}{16} - \dfrac{\alpha}{8}$ |
| $\dfrac{\alpha}{4} - \dfrac{\alpha^2}{2}$ | $\dfrac{\alpha}{4}$ | $\alpha^2$ | $\dfrac{\alpha}{4}$ | $\dfrac{\alpha}{4} - \dfrac{\alpha^2}{2}$ |
| $\dfrac{1}{16} - \dfrac{\alpha}{8}$ | $\dfrac{1}{16}$ | $\dfrac{\alpha}{4}$ | $\dfrac{1}{16}$ | $\dfrac{1}{16} - \dfrac{\alpha}{8}$ |
| $\left(\dfrac{1}{4} - \dfrac{\alpha}{2}\right)^2$ | $\dfrac{1}{16} - \dfrac{\alpha}{8}$ | $\dfrac{\alpha}{4} - \dfrac{\alpha^2}{2}$ | $\dfrac{1}{16} - \dfrac{\alpha}{8}$ | $\left(\dfrac{1}{4} - \dfrac{\alpha}{2}\right)^2$ |

CALCULATION OF
DIRECTION (N=3)

METHOD AND APPARATUS FOR INCREASING SPATIAL RESOLUTION OF AN IMAGE

BACKGROUND OF THE INVENTION

1. Field of the Invention

The present invention relates to an image processing apparatus, an image processing method and a storage medium, and more particularly, to an image processing apparatus, an image processing method and a storage medium, which are applicable to a wide variety of types of sources such as a still image and a moving image and which allows an edge of an image to be redrawn into a natural, clear, and beautiful form which gives a good visual impression to a human user thereby obtaining a high-quality and high-resolution image.

2. Description of the Related Art

Devices for dealing with a digital image (such as a digital camera and a video camera including a camera and a video tape recorder integrated into a single device) have become very popular. As a result, a need has arisen for a digital zooming process, and various methods for increasing the resolution of a digital image have been developed. In particular, three methods described below are known. A first method is a zero-order-hold interpolation method in which interpolation is performed by directly using nearest neighboring pixels. The advantage of this method is that interpolation can be performed using simple hardware.

A second method is a bilinear interpolation method in which the mean pixel value of two nearest neighboring pixels is calculated and the resultant value is used to insert a new pixel in the vertical and horizontal directions. Thus, this method is suitable for interpolation of adjacent pixels.

A third method is a B-spline interpolation method which allows an image to be interpolated without creating noise or a mosaic pattern.

However, the first method is not effective, in particular, when an image is enlarged by a large scaling factor, and an enlarged image includes noise well known as a "mosaic" pattern. Besides, an edge is destroyed to a large extent and very ugly jaggies appear.

The second method has the disadvantage that the resolution of an image is not increased and thus the image is blurred over the entire area thereof. In particular, when an image is enlarged by a large scaling factor, a significant mosaic effect occurs.

In the third method, an image is blurred to a rather large extent, and relatively complicated hardware is needed.

SUMMARY OF THE INVENTION

In view of the above, it is an object of the present invention to provide a technique of changing the resolution of a wide variety of still or moving images such as a computer-graphics image and a photographic image, using a simple process which needs a small amount of calculation.

According to an aspect of the present invention, there is provided an image processing apparatus for converting the resolution of an original image in such a manner as to increase the spatial resolution of the original image by a factor of Z in each of vertical and horizontal directions, the image processing apparatus comprising: energy calculating means for calculating local energy of the original image; detection means for detecting the direction of an edge on the basis of the local energy calculated by the energy calculating means; interpolation means for interpolating a new pixel from a pixel of the original image on the basis of the direction of the edge detected by the detection means; and edge enhancement means for performing an edge enhancement process on the basis of the local energy calculated by the energy calculating means.

The image processing apparatus may further comprise edge conversion means for converting a loose connection of the original image into a tight connection before the energy calculating means calculates the local energy.

The energy conversion means may replace the value of a particular pixel with the mean value of values of two pixels on the basis of values of pixels lying on a diagonal line.

When the local energy is greater than a predetermined threshold value, the edge enhancement means may perform a one-dimensional filtering process such that the values of pixels are multiplied by corresponding coefficients of a one-dimensional edge building filter and the respective products are together.

The interpolation means and the edge enhancement means may perform the interpolation and the edge enhancement upon the original image in each of vertical and horizontal directions.

The interpolation means may interpolate one new pixel from two pixels lying along the detected direction of the edge.

The interpolation means may perform linear interpolation when the edge is not detected by the detection means.

The image processing apparatus may further comprise consistency judging means for judging the consistency in terms of the local structure of the pixel interpolated by the interpolation means, wherein the interpolation means may perform linear interpolation when the consistency judging means judges that there is no consistency.

The energy calculating means may create an energy map corresponding to the size of the original image.

When the value of Z is greater than 2, the interpolation means and said edge enhancement means may perform, N times, processes which are to be performed when the value of Z is equal to 2 and perform, one time, processes which are to be performed when the value of Z is equal to or smaller than 2.

According to another aspect of the present invention, there is provided an image processing method of converting the resolution of an original image in such a manner as to increase the spatial resolution of the original image by a factor of Z in each of vertical and horizontal directions, the image processing method comprising the steps of: calculating local energy of the original image; detecting the direction of an edge on the basis of the local energy calculated in the energy calculating step; interpolating a new pixel from a pixel of the original image on the basis of the direction of the edge detected in the detection step; and performing an edge enhancement process on the basis of the local energy calculated in the energy calculating step.

According to still another aspect of the present invention, there is provided a storage medium storing thereon a computer-readable program for controlling an image processing apparatus to convert the resolution of an original image in such a manner as to increase the spatial resolution of the original image by a factor of Z in each of vertical and horizontal directions, the program comprising the steps of: calculating local energy of the original image; detecting the direction of an edge on the basis of the local energy calculated in the energy calculating step; interpolating a new pixel from a pixel of the original image on the basis of the direction of the edge detected in the detection step; and performing an edge enhancement process on the basis of the local energy calculated in the energy calculating step.

In the image processing apparatus, the image processing method; and the storage medium storing the program, according to the present invention, the direction of an edge is detected on the basis of local energy, and a pixel is interpolated on the basis of the detected direction of the edge and edge enhancement is performed on the basis of the local energy.

BRIEF DESCRIPTION OF THE DRAWINGS

FIG. 16 is a diagram illustrating two-dimensional filter coefficients of an edge builder;

DESCRIPTION OF THE PREFERRED EMBODIMENTS

Figure 1:
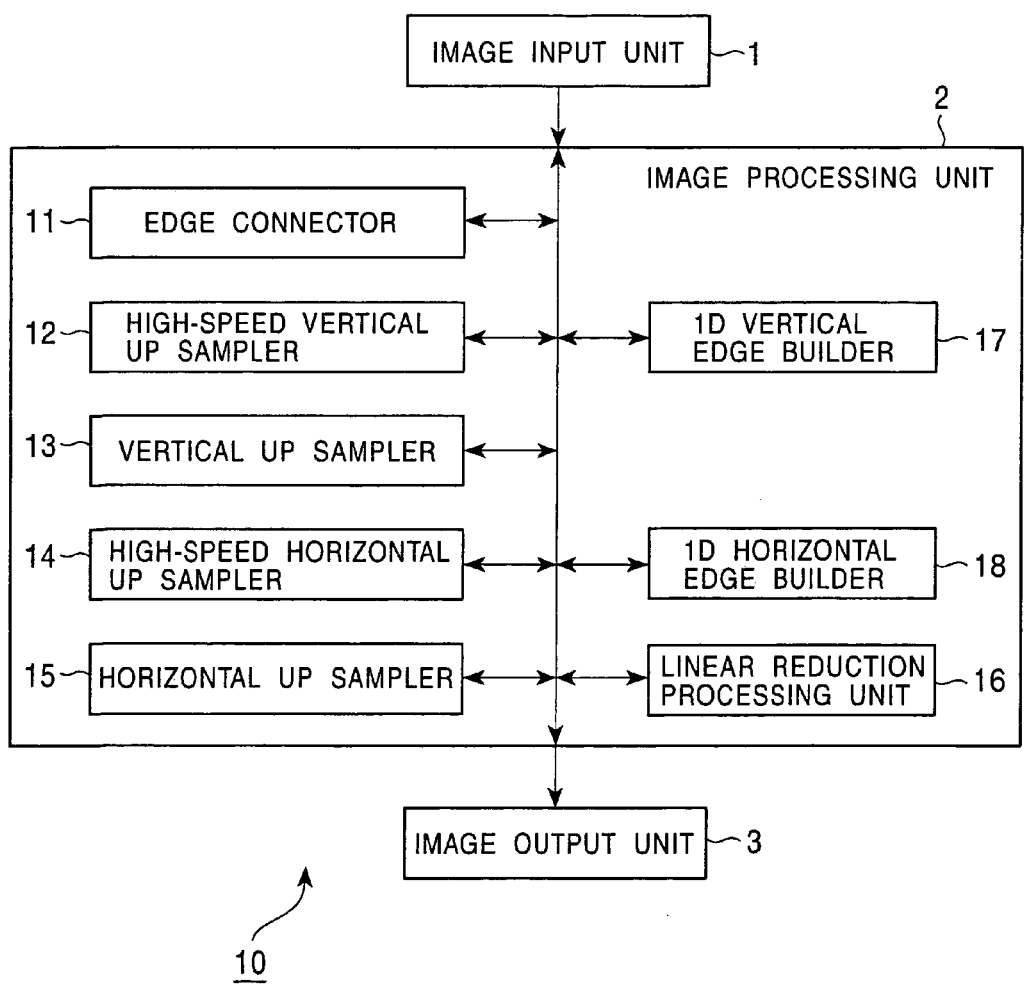
FIG. 1 is a block diagram illustrating an embodiment of an image processing apparatus according to the present invention.

FIG. 1 illustrates an embodiment of an image processing apparatus according to the present invention. In this image processing apparatus 10, image data to be processed is input via an image input unit 1 by reading image data from a storage medium or by receiving image data via a network, and the input image data is transferred to an image processing unit 2. The image processing unit 2 changes the resolution (expands or reduces the size) of the image received from the image input unit 1 and supplies the resultant data to an image output unit 3. The image output unit 3 displays the image data supplied from the image processing unit 2 on a display unit, stores it on a storage medium, or transmits it to another apparatus via a transmission medium.

The image processing unit 2 includes an edge connector 11. The edge connector 11 increases the edge width of an image. In the case of a small-size image, enlargement is difficult because such an image has a low resolution and includes a small amount of reliable information. If the edge is as thin as one pixel, difficulty occurs in edge detection performed by a high-speed vertical up sampler 12, a vertical up sampler 13, a high-speed horizontal up sampler 14, or a horizontal up sampler 15, which will be described later, and thus interpolation in the edge direction becomes difficult. In order to solve the above problem, an original image is pre-processed so that edges can be detected easily and precisely. This pre-processing is performed upon an image having a loose connection, such as an icon used in a computer or a font used in a word processor, in such a manner that the original image information is not destroyed.

The high-speed vertical up sampler 12 and the vertical up sampler 13 respectively increase the resolution of an original image in a vertical direction by a factor of Z. The high-speed vertical up sampler 12 is used when Z is greater than 1 and smaller than 2, and the vertical up sampler 13 is used when Z is equal to 2.

The high-speed horizontal up sampler 14 and the horizontal up sampler 15 respectively increase the resolution of an original image in a horizontal direction by a factor of Z. The high-speed horizontal up sampler 14 is used when Z is greater than 1 and smaller than 2, and the horizontal up sampler 15 is used when Z is equal to 2.

A linear reduction unit 16 reduces the resolution of the original image (that is, increases the resolution by factor of z<1).

A one-dimensional vertical edge builder 17 and a one-dimensional horizontal edge builder 18 respectively filter image data in the vertical and horizontal directions so as to edge-enhance the image and remove remaining errors. There is a possibility that the image becomes blurred during the up sampling process performed by the high-speed vertical up sampler 12, the vertical up sampler 13, the high-speed horizontal up sampler 14, or the horizontal up sampler 15. To avoid the above problem, an edge building processing is performed so as to enlarge an image while preserving edge information or so as to preserve clearness and contrast of an image.

An area in the vicinity of an edge can include noise which potentially has an influence upon the sharpness of the edge. Such noise causes the detection of the direction of the edge to be relatively inaccurate, and the inaccuracy of the detection of the edge direction can cause an error to propagate when the image is enlarged. This creates a possibility that pixels near an edge are calculated in an incorrect fashion and slight distortion is created.

In the edge building process, to avoid the above problem, low-sass filtering is locally performed to mix an imperfect pixel with a nearest neighboring pixel. Furthermore, in the edge building process, high-pass filtering is performed so as to enhance the sharpness of the image thereby achieving a great improvement in image quality.

Referring to a flow chart shown in FIG. 2, a zooming process performed by the image processing unit 2 is described below. First, in step S1, the image processing unit 2 sets a value of scaling factor Z into a variable z. Then in step S2, the image processing unit 2 determines whether the value of the variable z is equal to or greater than 2. If z is smaller than 2, the flow proceeds to step S3 to determine whether the value of the variable z is greater than 1 and smaller than 2. If the value of the variable z is greater than 1 and smaller than 2, the flow proceeds to step S4 in which the image processing unit 2 performs a high-speed zooming process. The high-speed zooming process will be described in detail later with reference to a flow chart shown in FIG. 3. Thereafter, in step S7, the result is output and displayed.

In the case where it is determined in step S3 that the value of the variable z is not within the range from 1 to 2, the flow proceeds to step S5 to determine whether the value of the variable z is equal to 0. If the value of the variable z is not equal to 0 (that is, if the value of the variable z is less than 1), the flow proceeds to step S6 to perform a linear reduction process according to a standard method. Thereafter, in step S7, the result is output and displayed. That is, the generated image is displayed on the display unit by the image output unit 3.

On the other hand, if it is determined in step S5 that the value of the variable z is equal to 0, it is concluded that the enlarging process has been completed after performing the zooming process in step S6 repeatedly a required number of times, and thus the flow proceeds to step S7 to output and display the result.

In the case where it is determined in step S2 that the value of the variable z is equal to or greater than 2, the flow proceeds to step S8 and the image processing unit 2 performs the zooming process. The details of the zooming process will be described in detail later with reference to a flow chart shown in FIG. 34. After completion of step S8, the flow proceeds to step S9 in which the image processing unit 2 divides the value of the variable z by 2. Thereafter, the flow returns to step S2 to repeat step S2 and following steps.

That is, if the value of the variable z is equal to or greater than 2, the process in step S8 is performed repeatedly until the value of the variable z becomes smaller than 2. After the value of the variable z has become smaller than 2, if the value of the variable z is within the range from 1 and 2, the high-speed zooming process is performed in step S4, while the normal linear reduction process is performed in step S6 if the value of the variable z is smaller than 1. The normal linear reduction process may be performed, for example, using a bilinear filter.

The high-speed zooming process in step S4 is described below with reference to the flow chart shown in FIG. 3. First, in step S11, image processing unit 2 determines whether the mode specified by a user is an image mode. If the mode specified by the user is not the image mode (that is, if the image to be processed is a loose connection image such as an icon or a font which needs the edge connection process), the flow proceeds to step S16 to perform the edge connection process. The edge connection process is a preprocess in which a loose connection image is converted into a tight connection image, as will be described in detail later with reference to FIGS. 30 and 31.

Figure 4:
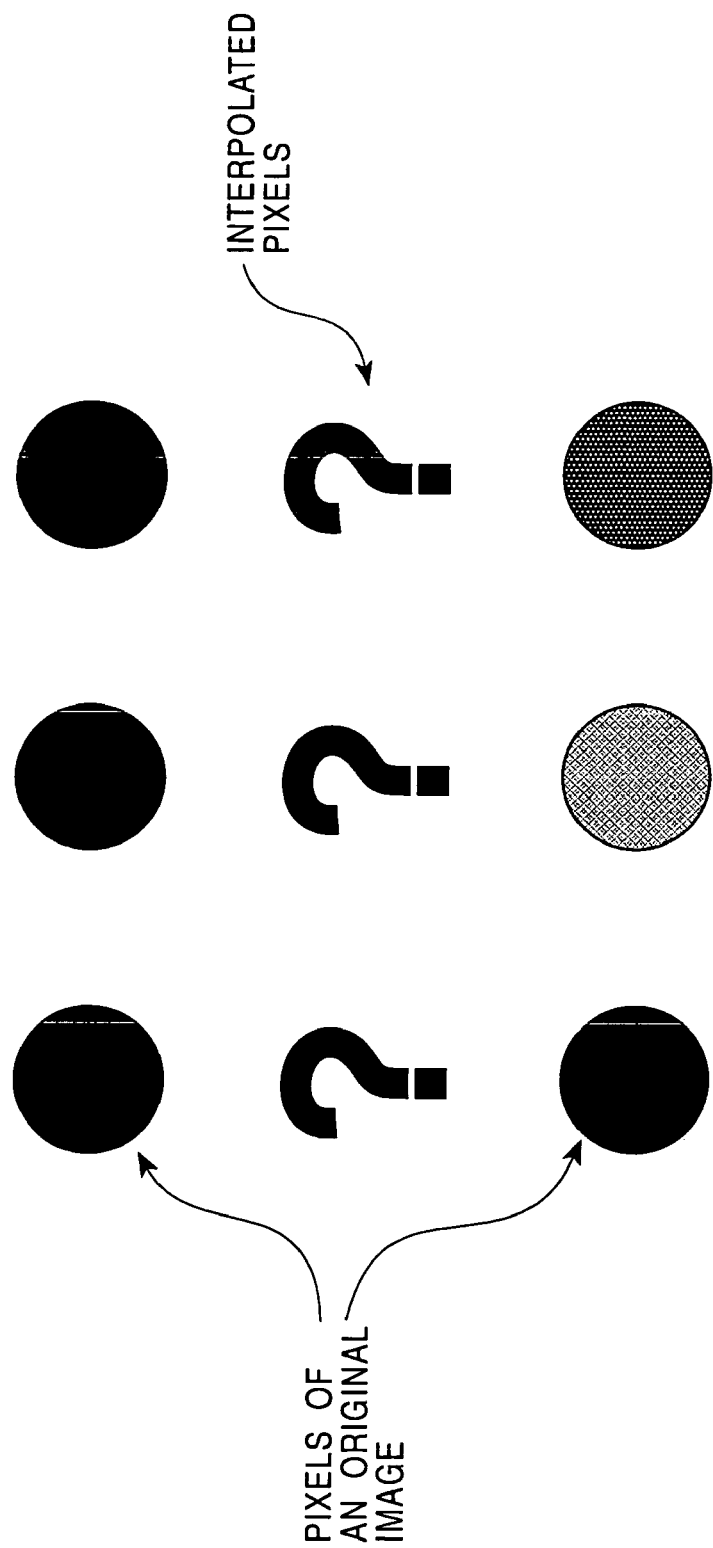
FIG. 4 is a diagram schematically illustrating a high-speed vertical up sampling process.

In the case where it is determined in step S11 that the image mode is specified (the image to be processed is of tight connection), the flow proceeds to step S12. The flow also proceeds to step S12 when step S16 is completed. In step S12, the image processing unit 2 performs the high-speed vertical up sampling process. In the high-speed vertical up sampling process, the number of pixels, as counted in a vertical direction, of an original image input via the image input unit 1 is increased as shown in FIG. 4. The high-speed vertical up sampling process is performed by the high-speed vertical up sampler 12.

Figure 5:
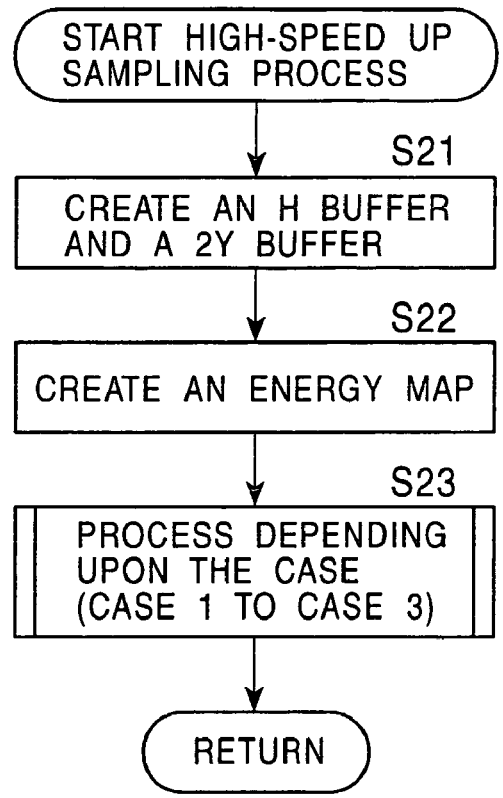
FIG. 5 is a flow chart illustrating a high-speed vertical up sampling process performed in step S12 in FIG. 3.

The details of the high-speed vertical up sampling process are shown in the flow chart of FIG. 5. In the first step S21, the high-speed vertical up sampler 12 creates a H buffer 31 (which will be described later with reference to FIG. 7) and a 2Y buffer 41 (which will be described later with reference to FIG. 13). In the case where the original image (I_image) input via the image input unit 1 has a size of In_width× In_height, the H buffer 31 is created so as to have a size of In_width×(alpha_Z×In_height). Herein, alpha_Z denotes a scaling factor by which the original image is to be enlarged in the vertical direction. In this specific case in which the high-speed vertical up sampling is performed, alpha_Z has a value greater than 1 and smaller than 2 (steps S3 and S4).

On the other hand, the 2Y buffer 41 is created so as to have a size of In_width×1. The 2Y buffer 41 is used to temporarily store interpolated pixels.

In step S22, the high-speed vertical up sampler 12 then creates an energy map having a size of In_width×In_height. Furthermore, in step S23, the high-speed vertical up sampler 12 performs a process depending upon the case (case 1 to case 3).

In this process, the Yth row of the H buffer 31 is generated by means of interpolation in a manner depending upon the case (case 1 to 3). Which process of cases 1 to 3 is employed to interpolate the Yth-row data is determined as follows.

In the present embodiment, a virtual image 2Y_image is created by enlarging the original image I_image in the vertical direction by a factor of 2. On the other hand, an image obtained by enlarging the original image I_image in the vertical direction by a factor of alpha_Z is stored in the H buffer 31. Herein, if the row number of the virtual image 2Y_image enlarged in the vertical direction by a factor of 2 is denoted by 2Y_line, and the row number of the image stored in the H buffer 31 is denoted by Y, then the following proportion holds.

$$Y:2Y\_line=alpha\_Z:2 \qquad (1)$$

Thus, the following equation is obtained from equation (1).

$$2Y\_line=Y\times 2/alpha_{13}Z \qquad (2)$$

When 2Y_line calculated according to equation (2) is equal to an even integer (that is, 2Y_line=2n where n is an integer), the interpolation of the Yth-row data is performed according to an algorithm in case 1. When 2Y_line calculated according to equation (2) is equal to an odd integer (that is, 2Y_line=2n+1 where n is an integer), the interpolation of the Yth-row data is performed according to an algorithm in case 2. In the other case, that is, when 2Y_line is a real number, the interpolation of the Yth-row data is performed according to an algorithm in case 3.

Figure 6:
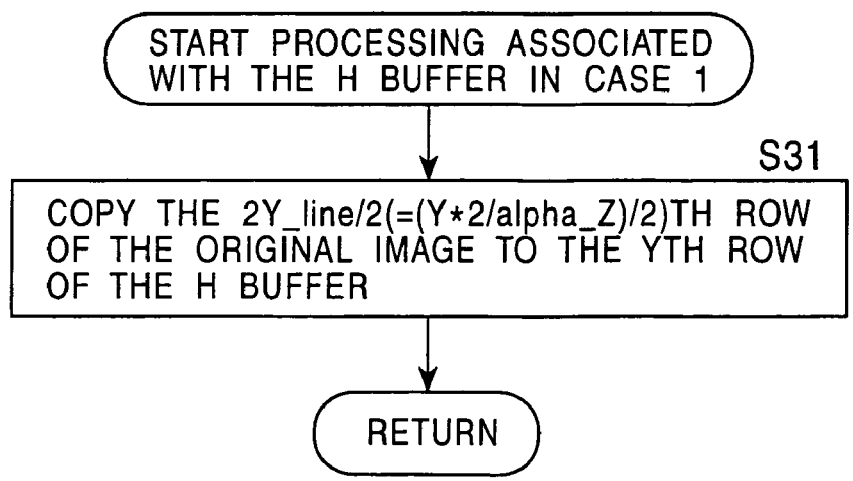
FIG. 6 is a flow chart illustrating a process performed.

The algorithm in case 1 is shown, in the form of a flow chart, in FIG. 6. That is, in case 1, the values of the Yth-row data in the H buffer 31 can correspond to the values (2Y_line/2=n) of a particular row of the original image I_image, and thus, in step S31, the 2Y_line/2th row of the original image I_image is directly copied to the Yth row of the H buffer 31.

Figure 7:
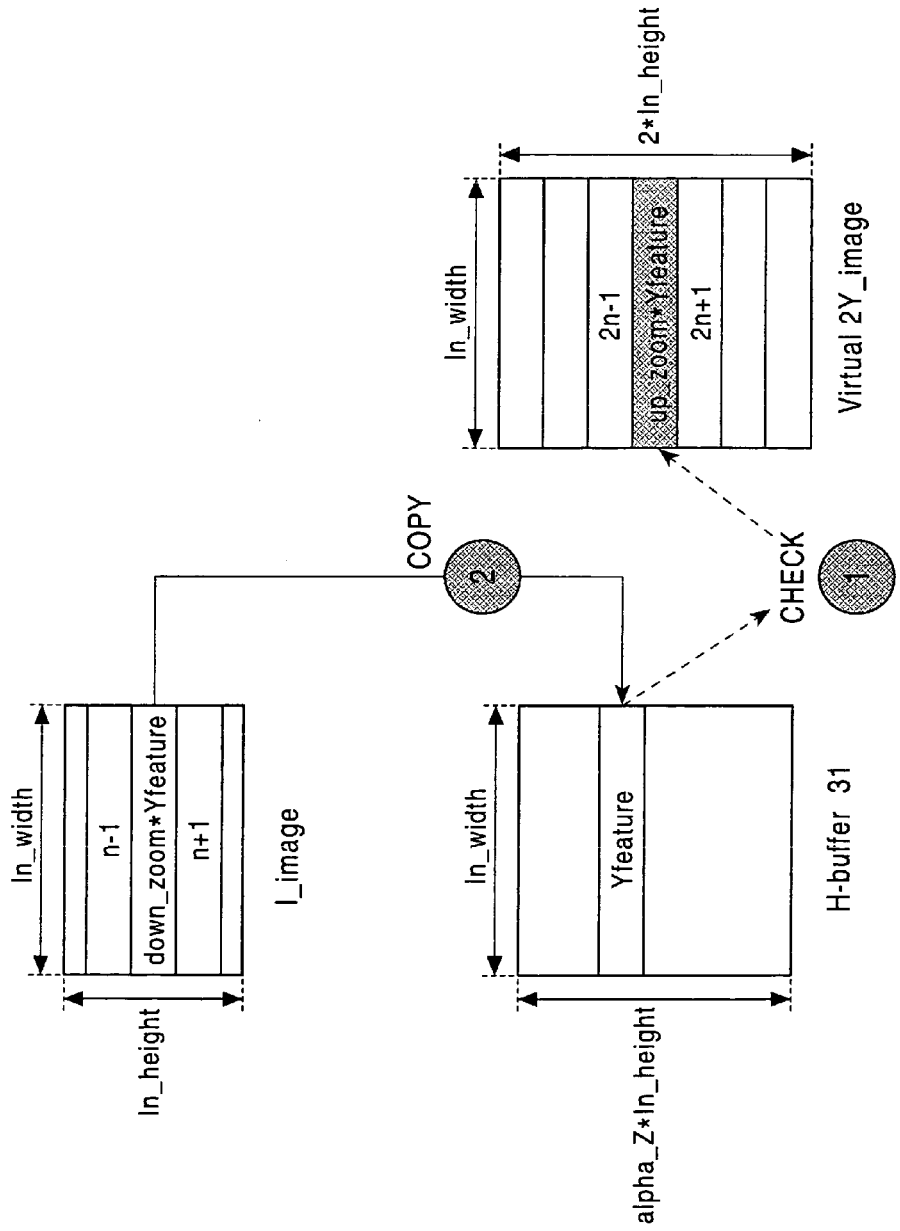
FIG. 7 is a diagram schematically illustrating the process in case 1 in FIG. 6.

This process performed in case 1 is schematically shown in FIG. 7. That is, in case 1, because the values of the Yth row of the H buffer should be equal to the values of the nth row of the original image I_image, the nth row (n=2Y_line/2) of the original image is directly copied to the Yth row of the H buffer.

The process performed in case 2 is described below with reference to a flow chart shown in FIG. 8. In case 2, because (2n+1)/2 is not an integer, the values of the Yth row of the H buffer 31 cannot correspond to a particular row of the original image I_image. However, the Yth row of the H buffer 31 can correspond to the (2n+1)th row of the virtual image 2Y_image enlarged in the vertical direction by a factor of 2.

Therefore, in case 2, pixels (N pixels) in an upper row (up_line) and a lower row (down_line) within a predetermined area in the original image I_image are extracted in step S41. Herein, N is variable. Thus, the coordinates of the center point of the upper row (up_line) are given as (X+N/2, n) and the coordinates of the center point of the lower row (down_line) are given as (X+N/2, n+1).

Thereafter, in step S42, local energy E(N) is calculated according to the following equation.

$$E(N)=\Sigma_{I=0:N-1}ABS(\text{up\_line}(I)-\text{down\_line}(N-I-1)) \qquad (3)$$

In the above calculation according to equation (3), the pixel values of the respective pixels in the upper row (up_line) are reduced by amounts of the pixel values of the corresponding pixels at the diagonal locations in the lower row (down_line), and the sum of the absolute values of those differences is determined.

Figure 9:
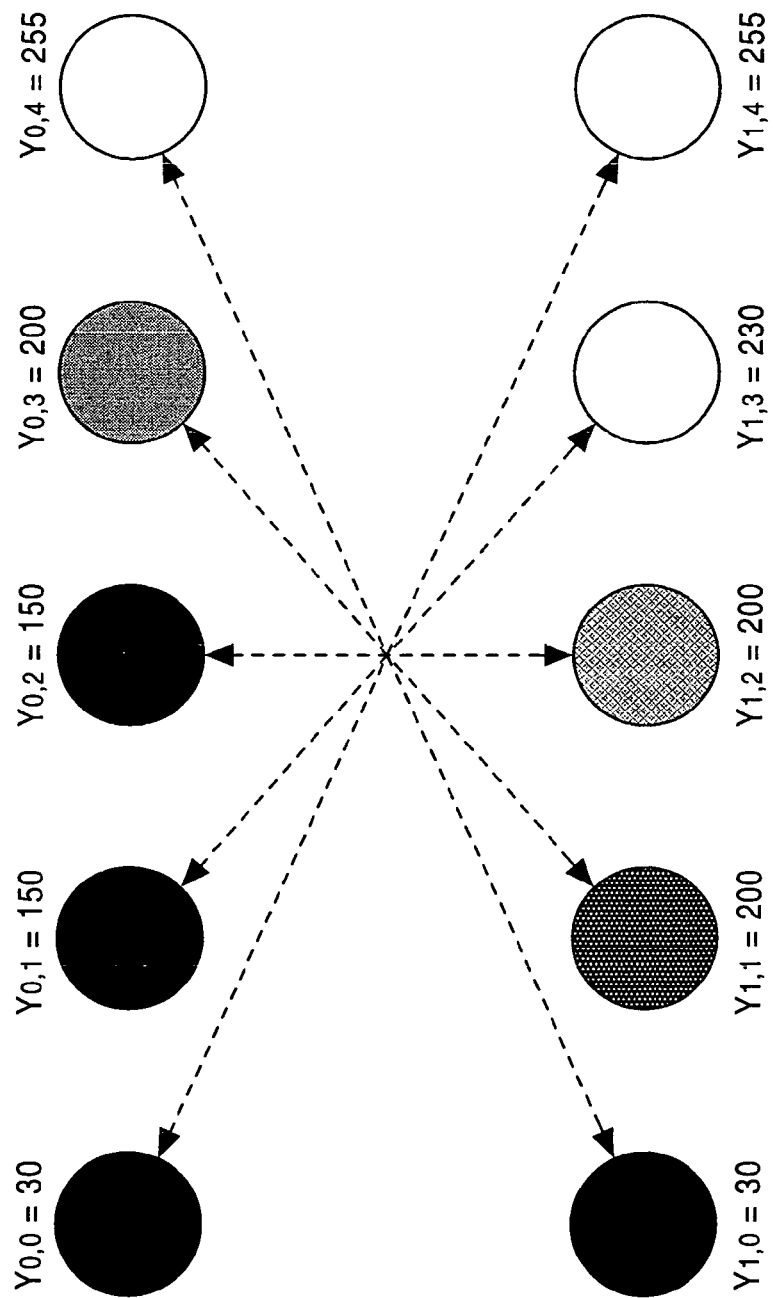
FIG. 9 is a diagram schematically illustrating the calculation of local energy, performed in step S42 in FIG. 8.

FIG. 9 illustrates an example of calculation of the local energy E(N). As shown in FIG. 9, for each pair of pixels lying on a diagonal line, the pixel value of a pixel in a lower row is subtracted from the pixel value of a pixel in an upper row. The pixel value differences are calculated for the respective diagonal lines, and the sum of absolute values of the differences is employed as the local energy E(N). In the specific example shown in FIG. 9, the pixel value (255) of the pixel $Y_{1,4}$ is subtracted from the pixel value (30) of the pixel $Y_{0,0}$, and the pixel value (230) of the pixel $Y_{1,3}$ is subtracted from the pixel value (150) of the pixel $Y_{0,1}$. Similarly, the pixel value (200) of the pixel $Y_{1,2}$ is subtracted from the pixel value (150) of the pixel $Y_{0,2}$, the pixel value (200) of the pixel $Y_{1,1}$ is subtracted from the pixel value (200) of the pixel $Y_{0,3}$, and the pixel value (30) of the pixel $Y_{1,0}$ is subtracted from the pixel value (255) of the pixel $Y_{0,4}$. Thereafter, the sum of the absolute values of these differences is calculated and the resultant sum is employed as the local energy.

In step S43, the high-speed vertical up sampler 12 puts the local energy E(N) calculated in step S42 at coordinates (X+N/2, n) of the energy map created in step S22. This local energy is used in a one-dimensional vertical edge building process in step S13 as will be described later.

Then in step S44, the high-speed vertical up sampler 12 determines whether the local energy E(N) is greater than a predetermined threshold value T. When the local energy E(N) is equal to or smaller than the threshold value T, the area is regarded as a low-energy flat area including no edge. In this case, it is not needed to calculate the direction of a latent edge. Thus, the process proceeds to step S50 in which the high-speed vertical up sampler 12 calculates the mean value of a pixel up_line(N/2) at the center of an adjacent upper row and a pixel down_line(N/2) at the center of an adjacent lower row and employs the resultant mean value as the pixel value at coordinates (X+N/2, Y) of the data in the H buffer 31. The calculated pixel value is stored at the coordinates (X+N/2, Y) in the H buffer 31. That is, in step S50, linear interpolation is performed in a standard manner according to the following equation.

$$H\_\text{buffer}(X+N/2, Y)=0.5\times(\text{up\_line}(N/2)+\text{down\_line}(N/2)) \qquad (4)$$

In the case where it is determined in step S44 that the local energy E(N) is greater than the threshold value T, the local area is regarded as a high-energy area including a latent edge. In this case, the process proceeds to step S45 to attempt to calculate the possible direction of the edge. More specifically, the following calculation is performed while decrementing the value of x starting from N−1 until the value of x becomes equal to or smaller than −1.

$$\text{Energy}=ABS(\text{up\_line}(N-x-1)-\text{down\_line}(x)) \qquad (5)$$

Of the energy values calculated in accordance with equation (5), the lowest energy value is selected, and the line between the two pixels associated with the selected lowest energy value is regarded to indicate the direction of the edge in the local area.

Figure 10:
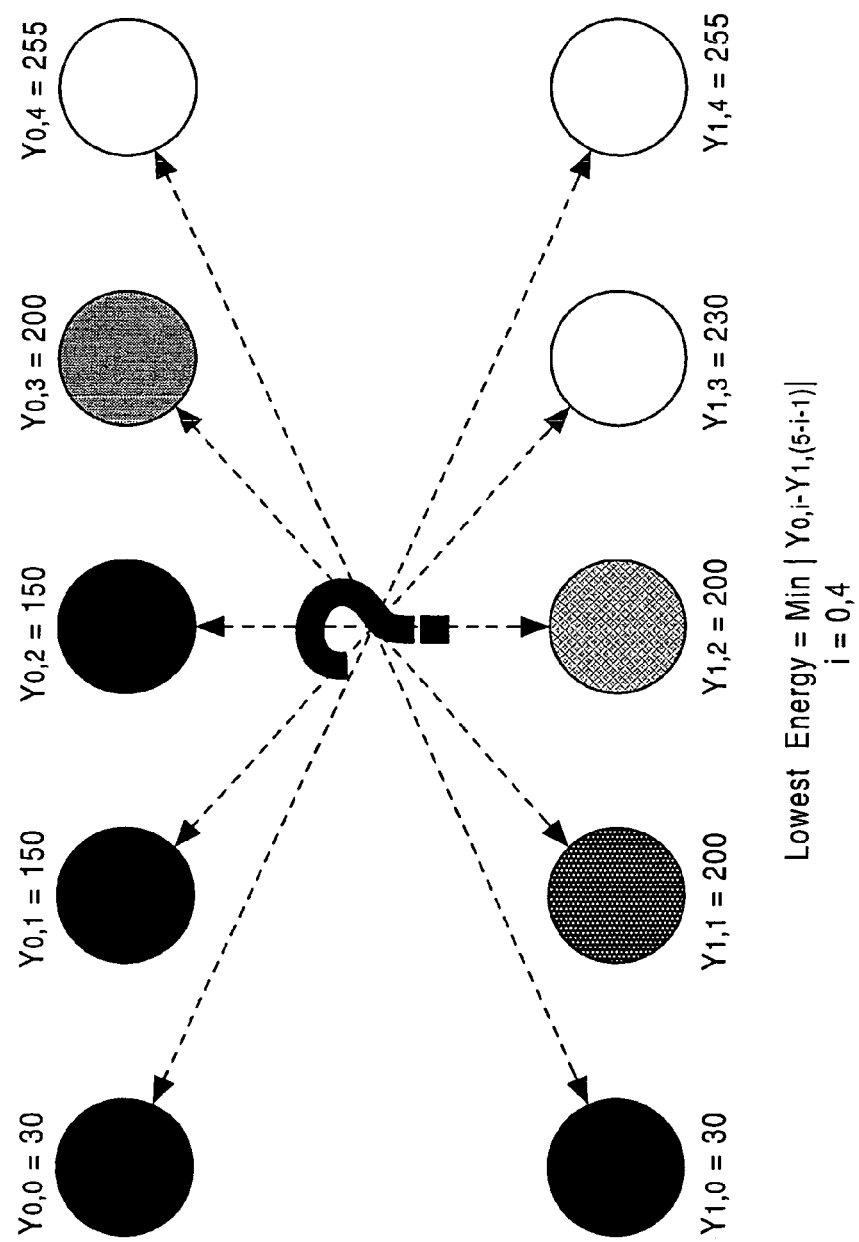
FIG. 10 is a diagram schematically illustrating the calculation of the direction of an edge, performed in step S45 in FIG. 8.

A specific example is shown in FIG. 10. In this specific example, the difference between the pixel value (30) of a pixel $Y_{0,0}$ and the pixel value (255) of a pixel $Y_{1,4}$, the difference between the pixel value (150) of a pixel $Y_{0,1}$ and the pixel value (230) of a pixel $Y_{1,3}$, the difference between the pixel value (150) of a pixel $Y_{0,2}$ and the pixel value (200) of a pixel $Y_{1,2}$, the difference between the pixel value (200) of a pixel $Y_{0,3}$ and the pixel value (200) of a pixel $Y_{1,1}$, and the difference between the pixel value (255) of a pixel $Y_{0,4}$ and the pixel value (30) of a pixel $Y_{1,0}$ are calculated. Of the absolute values of these differences, the lowest value (the difference between the pixel values of pixels $Y_{0,3}$ and $Y_{1,1}$ in this specific example) is selected and the direction between the two pixels which give the lowest value is employed as the local edge direction.

Figure 11:
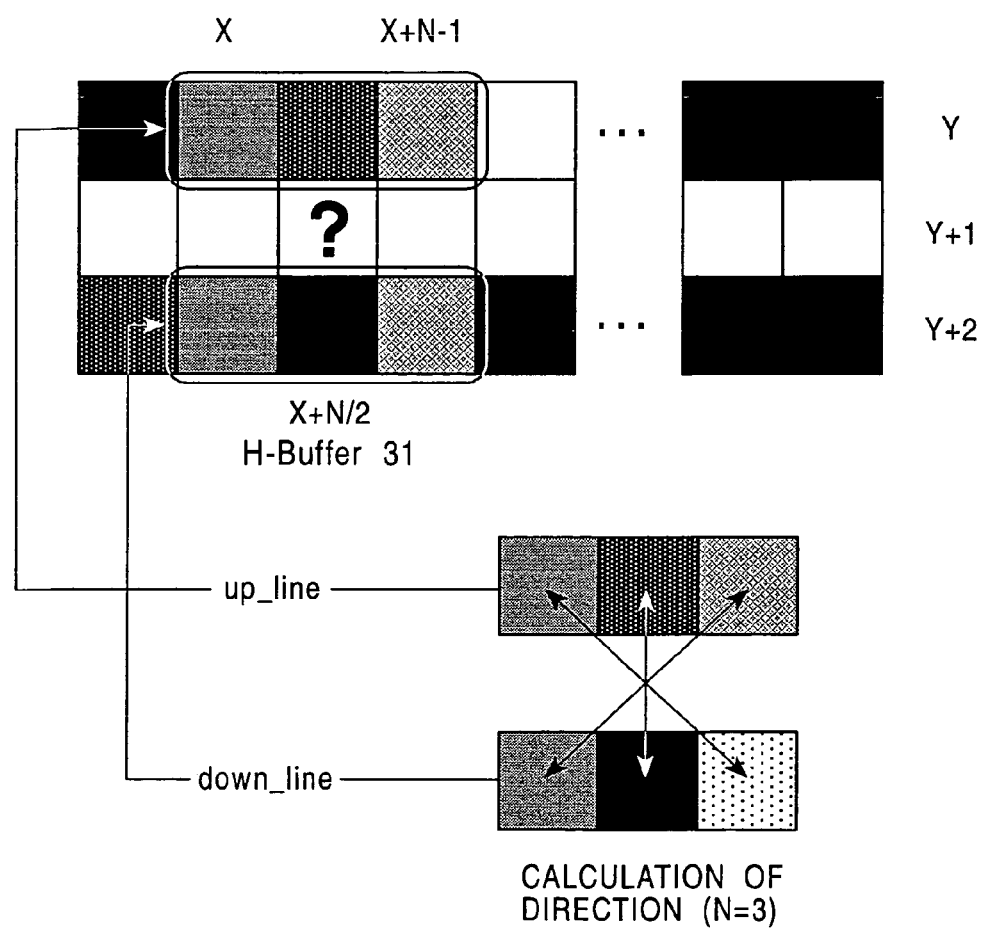
FIG. 11 is a diagram schematically illustrating the calculation of the direction of an edge, performed in step S45 in FIG. 8.

FIG. 11 illustrates an example in which a local edge direction is calculated from three pixels in an upper row (up_line) and three pixels in a lower row (down_line) stored in the H buffer 31. Although N=3 in this example shown in FIG. 11, N may have a greater value to detect the edge direction more precisely from a greater number of candidates for directions.

If the edge direction is detected in step S45, then interpolation (directional interpolation) is performed in the following step S46 using pixels lying in the detected edge direction. More specifically, in this directional interpolation, a pixel value of a pixel located between the two pixels lying in the detected edge direction is interpolated from the pixel values of the two pixels lying in the detected edge direction. In the example shown in FIG. 10, the mean value (200) of the pixel values of the pixels $Y_{0,3}$ and $Y_{1,1}$ is employed as the pixel value of the pixel between these two pixels.

This method makes it possible to interpolate the pixel while preserving the clearness and the contrast of the original image without causing the original image to be blurred, compared with the standard linear interpolation (step S50) in which the mean value of the pixel value at the center of an upper row and the pixel value at the center of a lower row is employed as a new pixel value for all cases.

Thereafter, in step S47, the high-speed vertical up sampler 12 performs a structure correction process. In this structure correction process, the relationship among a pixel interpolated at coordinates (X+N/2, Y) and vertically adjacent pixels, that is, pixels up_line(N/2) and down_line(N/2) is analyzed to check the consistency in terms of the created local structure (formed of the pixel created in the directional interpolation process in step S46 and the upper and lower pixels).

More specifically, in the structure correction process, the created pixel value is subtracted from the pixel value at the center of the upper row, and the pixel value at the center of the lower row is subtracted from the created pixel value. These two differences are multiplied with each other to obtain a value V(N/2) indicating the change in the vertical direction. That is, in step S47, calculation is performed in accordance with the following equation.

$$V(N/2) = (\text{up\_line}(N/2) - H\text{-buffer}(X+N/2, Y)) \times (H\text{-buffer}(X+N/2, Y) - \text{down\_line}(N/2)) \quad (6)$$

Thereafter, in step S48, the high-speed vertical up sampler 12 determines, on the basis of the result of the calculation performed in step S47, whether consistency is achieved in the created local structure. This determination is based whether or not the value V(N/2) calculated according to equation (6) is positive. If the value V(N/2) is positive, it is determined that the local structure has consistency. In this case, the process proceeds to step S49 and the pixel value created in the directional interpolation in step S46 is stored in the Yth row of the data in the H buffer 31. Furthermore, this pixel value is also stored in the 2Y buffer 41 (FIG. 13) created in step S21 (FIG. 5).

On the other hand, if it is determined in step S48 that the value V(N/2) is negative, it is determined that the local structure does not have consistency. That is, it is determined that the local edge direction has been incorrectly detected, and thus the pixel value created in step S46 is not adequate.

In this case, it is determined that detection of the local edge direction is impossible, and the process proceeds to step S50. In step S50, as in the case where it is determined in step S44 that the local energy E(N) is smaller than the threshold value T, the standard linear interpolation is performed according to equation (4). That is, the mean value of the pixel value at the center of the upper row (up_line(N/2)) and the pixel value at the center of the lower row (down_line (N/2)) is employed as the pixel value of a new pixel(X+N/2, Y), between the upper and lower rows, in the H buffer 31.

Figure 8:
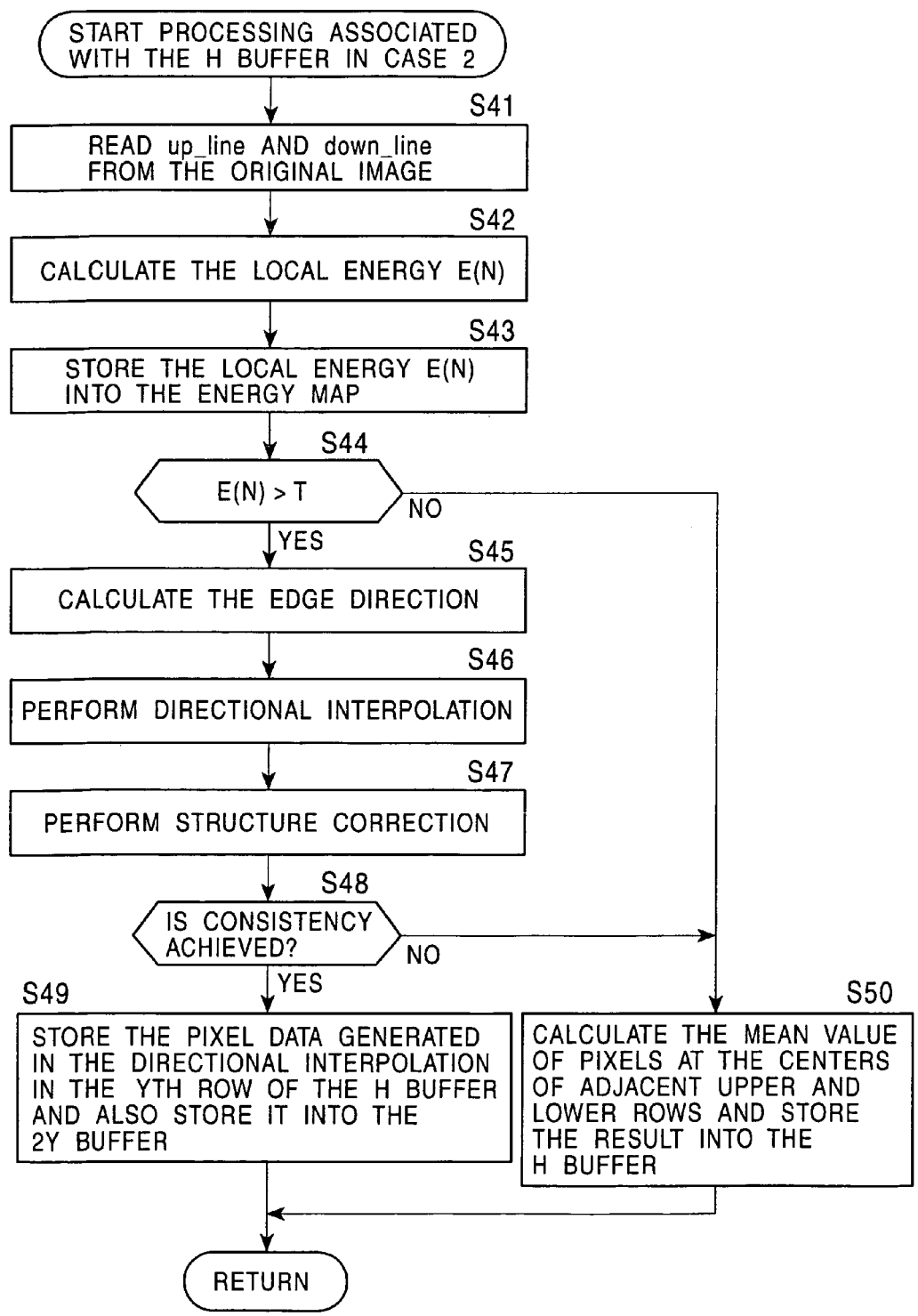
FIG. 8 is a flow chart illustrating a process performed, in case 2, in step S23 in FIG. 5.
Figure 12:
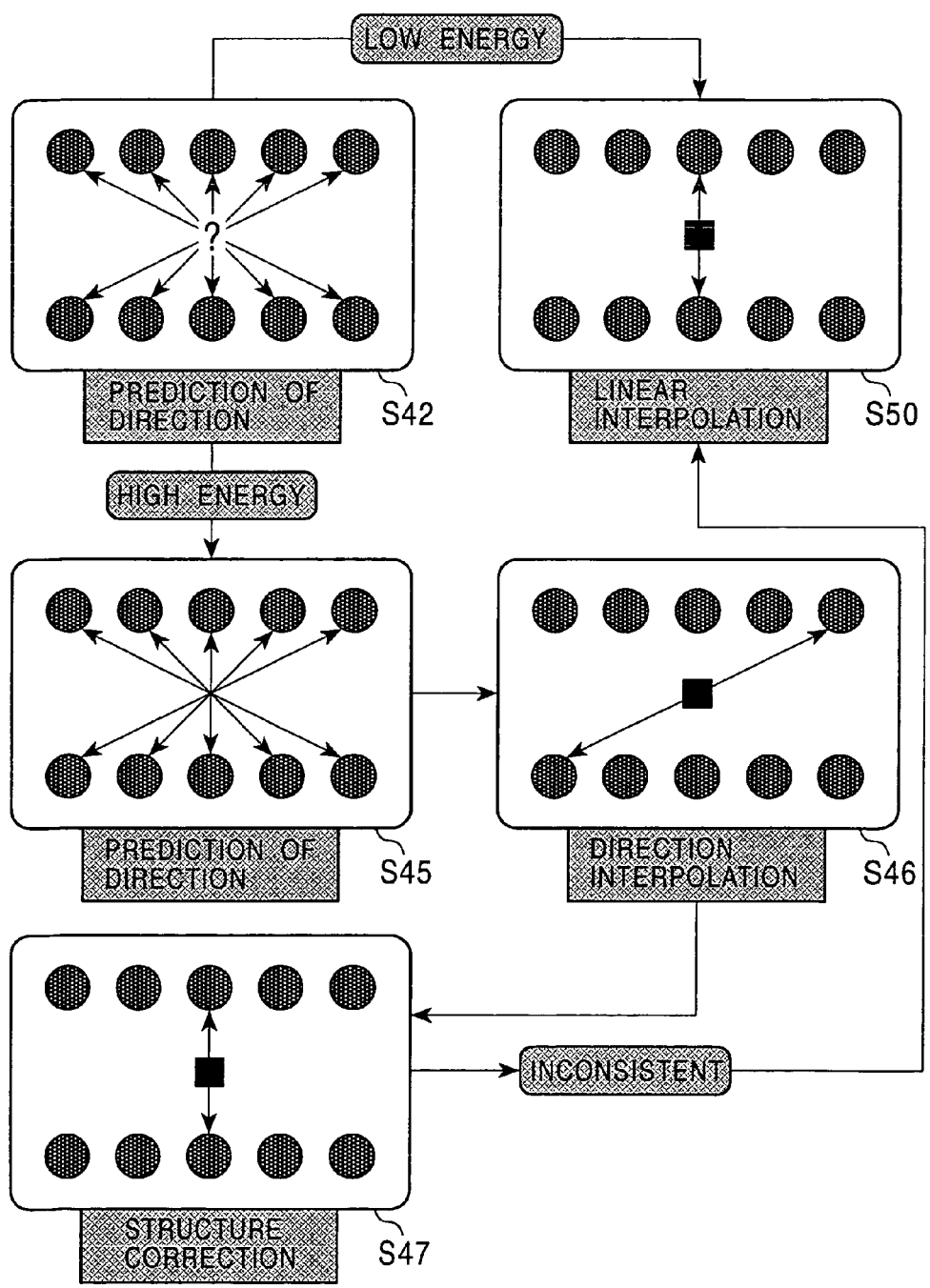
FIG. 12 is a diagram schematically illustrating a process in case 2 shown in FIG. 8.

The process in case 2 shown in FIG. 8 is schematically illustrated in FIG. 12.

In step S42, the local energy is calculated. If the calculated value is smaller than the threshold value T (that is, if the energy is low), the linear interpolation is performed in step S50. However, if the local energy is greater than the threshold value T (that is, if the energy is high), the edge direction is calculated in step S45. In this case, the directional interpolation is performed, in step S46, on the basis of the edge direction determined in step S45. Furthermore, the structure correction is performed in step S47. If the structure is determined to have consistency, the pixel value generated by means of the directional interpolation in step S46 is stored in the H buffer 31. However, if the structure is determined not to have consistency, the linear interpolation is performed in step S50.

Figure 13:
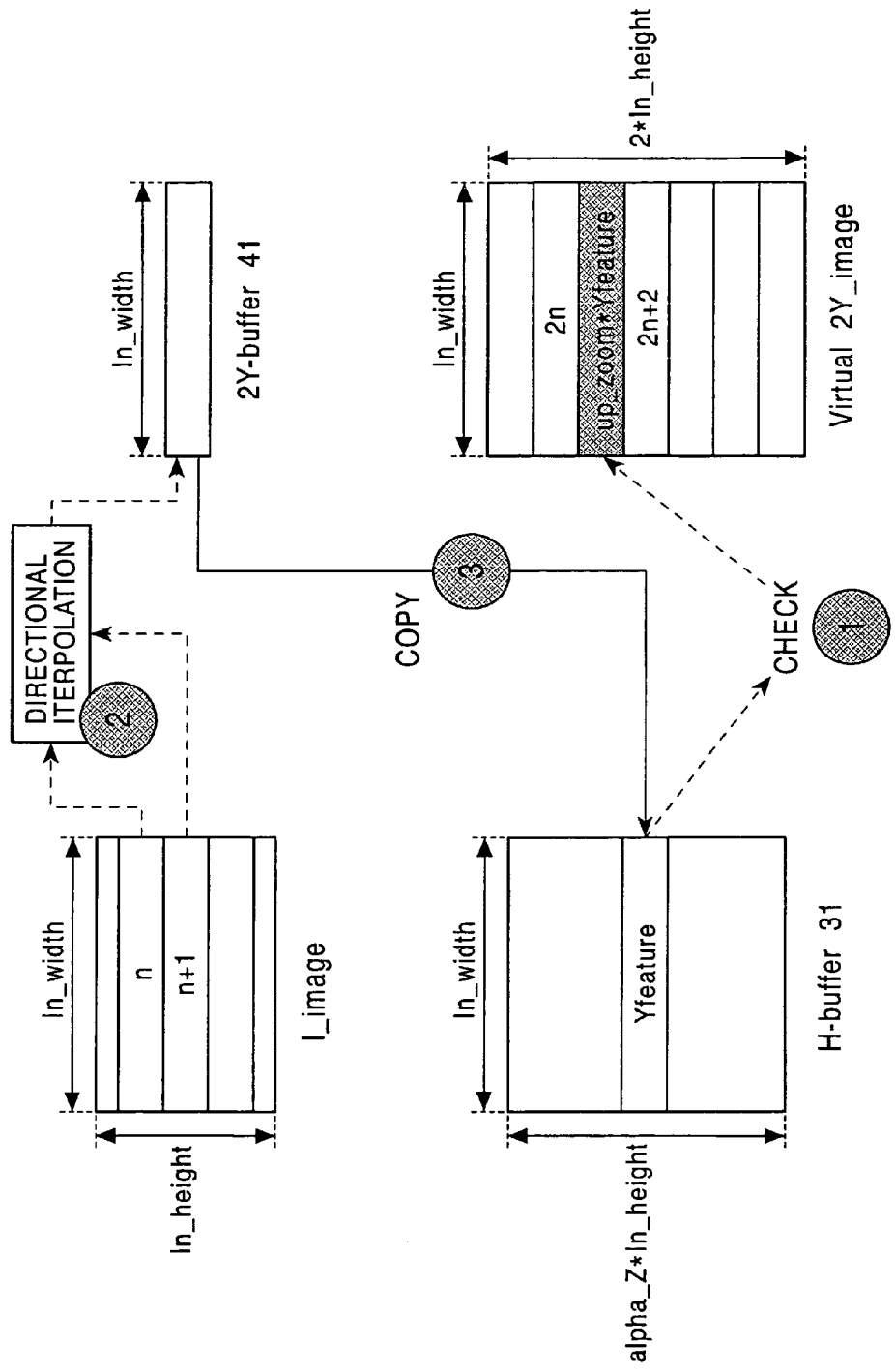
FIG. 13 is a diagram schematically illustrating the process in case 2 in FIG. 8.

FIG. 13 schematically illustrates the process in case 2 shown in the flow chart of FIG. 8, wherein the relationships among the original image I_image, the H buffer 31, the 2Y buffer 41, and the virtual image 2Y_image enlarged in the vertical direction by a factor of 2 are shown. When the Yth row of the data in the H buffer 31 has a particular relationship with the 2Y_lineth row of the virtual image 2Y_image enlarged in the vertical direction by a factor of 2, the directional interpolation is performed on the basis of the values of the nth and (n+1)th row of the original image I_image, and the resultant data is stored in the 2Y buffer 41. The data stored in the 2Y buffer 41 is then copied (stored) to the Yth row of the data in the H buffer 31.

The process performed in case 3 is described below with reference to a flow chart shown in FIG. 14. This process is performed when 2n<2Y_line<2n+1 or 2n−1<2Y_line<2n, that is, the values of the Yth row of the data in the H buffer 31 do not correspond to the values of any row of the virtual image 2Y_image enlarged in the vertical direction by a factor of 2 and do not correspond to the values of any row of the original image I_image.

In this case, it is determined, in step S61, whether the value of 2Y_line is greater than 2n and smaller than 2n+1. If the value of 2Y_line is greater than 2n and smaller than 2n+1, the Yth row of the data of the H buffer 31 is created from the (2n+1)th row and the 2nth row of the virtual image 2Y_image enlarged in the vertical direction by a factor of 2.

Thus, in this case, in step S62, the high-speed vertical up sampler 12 calculates the (2n+1)th row of the virtual image 2Y_image enlarged in the vertical direction by a factor of 2 using the adjacent upper row (2nth row) and lower row ((2n+2)th row) (the nth row and (n+1)th row of the original image I_image) in a similar manner to steps S41 to S50 in case 2 shown in the flow chart of FIG. 8. There is a possibility that the result calculated in step S62 will be used to calculate the next row ((n+1)th row) of the H buffer 31, and thus the result is stored, in step S63, into the 2Y buffer 41.

Furthermore, in step S64, the Yth row of the H buffer 31 is calculated from the (2n+1)th row calculated in step S62 (and stored in the 2Y buffer 41) and the 2nth row of the virtual image 2Y_image enlarged in the vertical direction by a factor of 2 (nth row of the original image I_image) in accordance with an equation shown below, and the result is stored in the Yth row of the H buffer 31.

$$H\_buffer(X, Y)=(2Y\_line-2n) \times 2Y\text{-buffer}(X)+ (2n+1-2Y\_line) \times I\_image(X, n) \quad (7)$$

In the process in steps S62 to S64, as described above, an image is created by enlarging the original image I_image by a factor of 2 in the vertical direction, and then, from this image and the original image I_image, an image with a size enlarged by a factor of alpha_Z is created.

On the other hand, if it is not determined in step S61 that the value of 2Y_line is greater than 2n and smaller than 2n+1 (that is, if it is determined that the value of 2Y_line is greater than 2n−1 and smaller than 2n), the Yth row of the H buffer is created from the (2n−1)th row and the 2nth row of the virtual image 2Y_image enlarged in the vertical direction by a factor of 2. Herein, there is a possibility that the (2n−1)th row has already been calculated and stored in the 2Y buffer 41 when the previous row of the H buffer 31 was determined. Thus, in step S65, it is determined whether the (2n−1)th row has already been stored in the 2Y buffer 41. If it already exists in the 2Y buffer 41, the data of the (2n−1)th row is read, in step S68, from the 2Y buffer 41.

On the other hand, if it is determined in step S65 that the data of the (2n−1)th row does not exist in the 2Y buffer 41, the process proceeds to step S66 to calculate the (2n−1)th row of the virtual image 2Y_image enlarged in the vertical direction by a factor of 2 using the upper row ((2n−2)th row) and lower row (2nth row) (the (n−1)th row and nth row of the original image I_image) in a similar manner to steps S41 to S50 in case 2 shown in the flow chart of FIG. 8. There is a possibility that the values of the (2n−1)th row calculated in step S66 will be used in calculation of the next row ((Y+1)th row) of the H buffer 31, and thus the calculated values of the (2n−1)th row are stored, in step S67, in the 2Y buffer 41.

After completion of step S67 or step S68, the process proceeds to step S69. In step S69, the Yth row of the H buffer 31 is interpolated from the (2n−1)th row and the 2nth row of the virtual image 2Y_image enlarged in the vertical direction by a factor of 2 (the nth row of the original image) in accordance with the following equation.

$$H\text{-buffer}(X, Y)=(2n-2Y\_line) \times 2Y\text{-buffer}(X)+ (2Y\_line-(2n-1)) \times I\_image(X, n) \quad (8)$$

The above calculation is performed while incrementing the value of X starting from X=0 until X becomes smaller than In_width.

In order to calculate undetermined pixel values of rows of the H buffer 31, a similar calculation is performed repeatedly for coordinates (X+N/2, Y) which satisfy the following conditions: −1<X<In_width−N+1, and −1<Y alpha_Z×In_height−1.

In case 3, as described above, weighted interpolation is performed using the 2nth row and the (2n+1)th row or the (2n−1)th row and the 2nth row of the virtual image 2Y_image enlarged in the vertical direction by a factor of 2.

Figure 14:
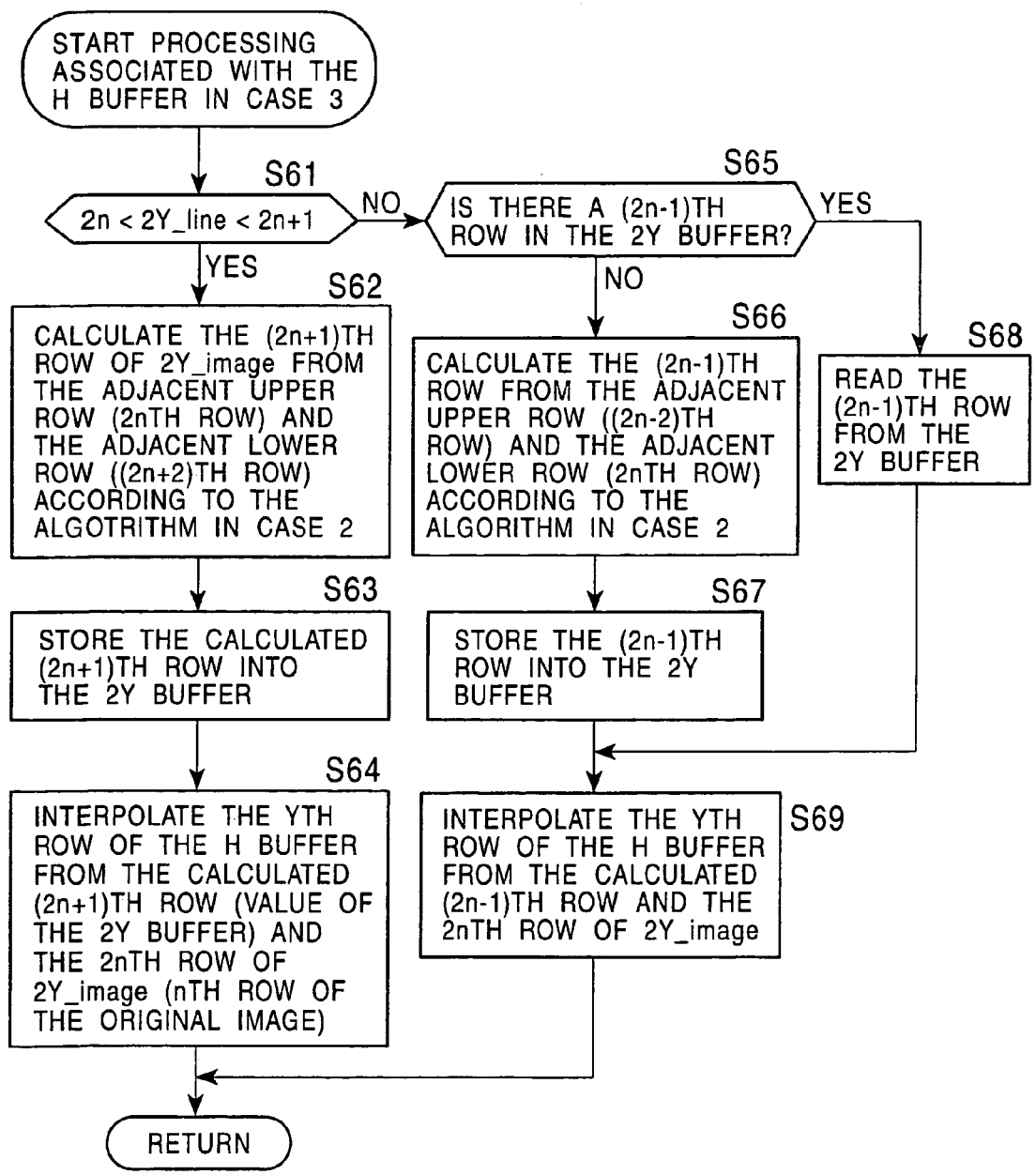
FIG. 14 is a flow chart illustrating a process performed, in case 3, in step S23 in FIG. 5.
Figure 15:
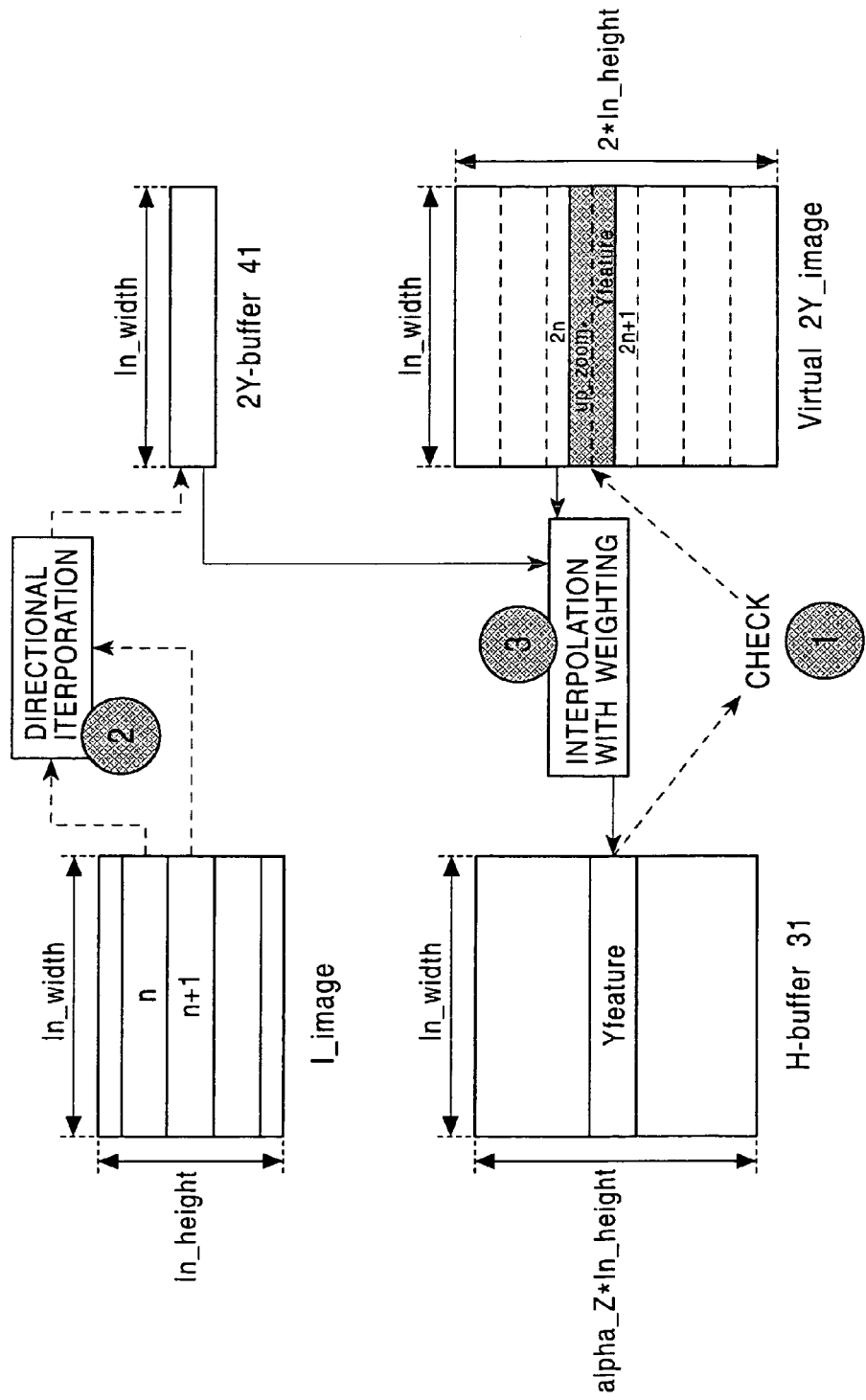
FIG. 15 is a diagram schematically illustrating the process performed in case 3 in FIG. 14.

FIG. 15 schematically illustrates the process in case 3 shown in FIG. 14. When the row number 2Y_line of the virtual image 2Y_image enlarged in the vertical direction by a factor of 2 is greater than 2n and smaller than 2n+1, the data of the (2n+1)th row or the (2n−1)th row is created by means of directional interpolation from the nth and (n+1)th rows of the original image I_image and is stored in the 2Y buffer 41. Thereafter, the Yth row of the H buffer 31 is created by means of weighted interpolation from the values stored in the 2Y buffer 41 and the 2nth-row data of the virtual image 2Y_image enlarged in the vertical direction by a factor of 2.

Figure 3:
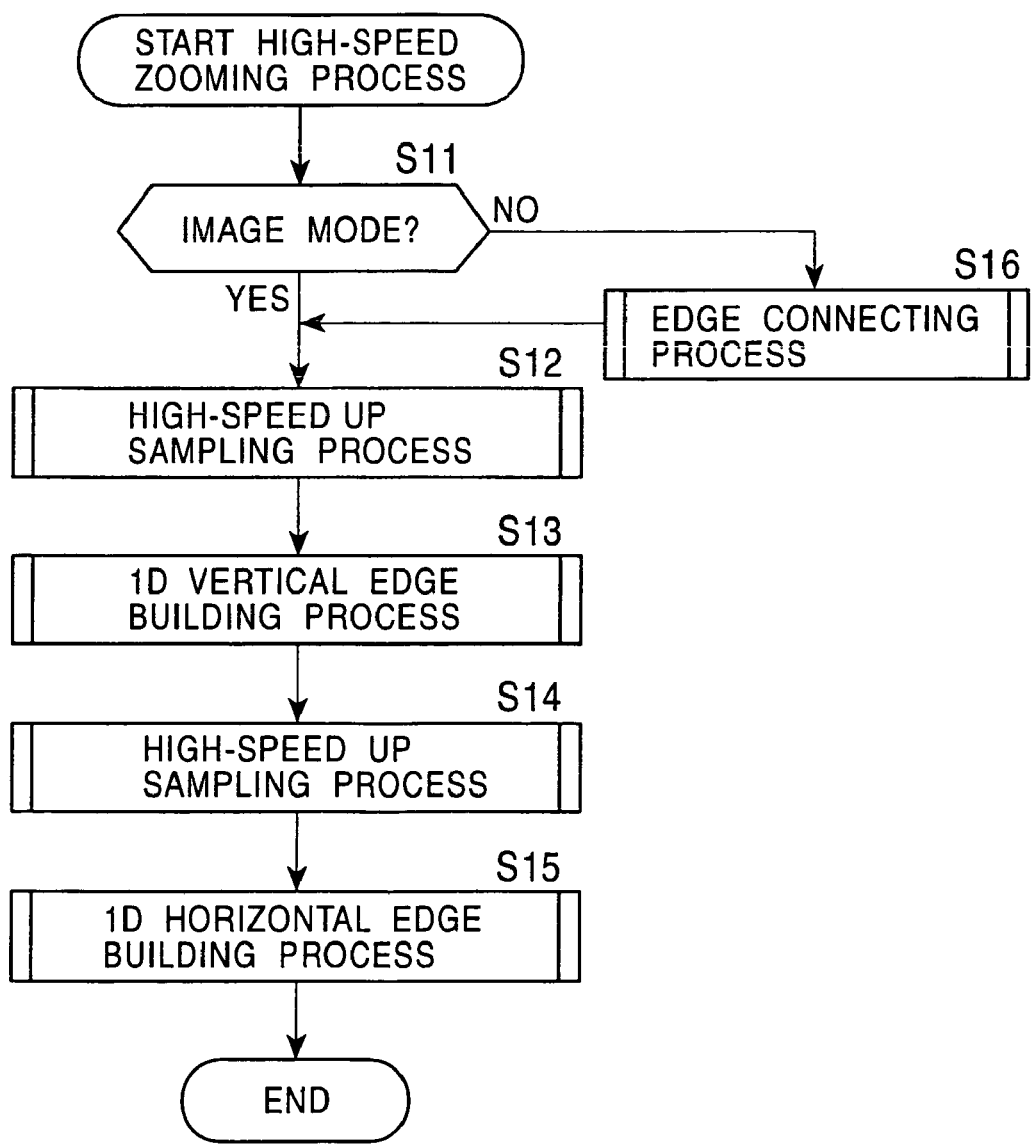
FIG. 3 is a flow chart illustrating a high-speed zooming process performed in step S4 in FIG. 2.

Referring again to the flow chart shown in FIG. 3, after performing of the high-speed vertical up sampling process in step S12 in the above-described manner, the process proceeds to step S13 to perform a one-dimensional vertical edge building process. The one-dimensional vertical edge building process is a part of a two-dimensional filtering process in step S15 which further includes, in addition to the one-dimensional vertical edge building process, a one-dimensional horizontal edge building process. Although the two-dimensional filtering process may be divided into the one-dimensional vertical edge building process and the one-dimensional horizontal edge building process as in this specific example, the two-dimensional filter process may be performed without dividing the two processes. In this case, for example, 5×5 filter coefficients such as those shown in FIG. 16 are employed, and 5×5 pixel values are multiplied by the corresponding respective filter coefficients, and the sum of the products is employed as the pixel value of the pixel at the center of the 5×5 pixels.

A parameter α included in some filter coefficients shown in FIG. 16 is greater than 0.5 and smaller than 1.4. The value of α is given by the following equation.

$$\alpha = 1.4 - (0.1 \times alpha\_Z) \quad (9)$$

Herein, alpha_Z is a scaling factor specified by an user. By adjusting the scaling factor, it is possible to correct an error and to adjust the edge enhancement.

Figure 17:
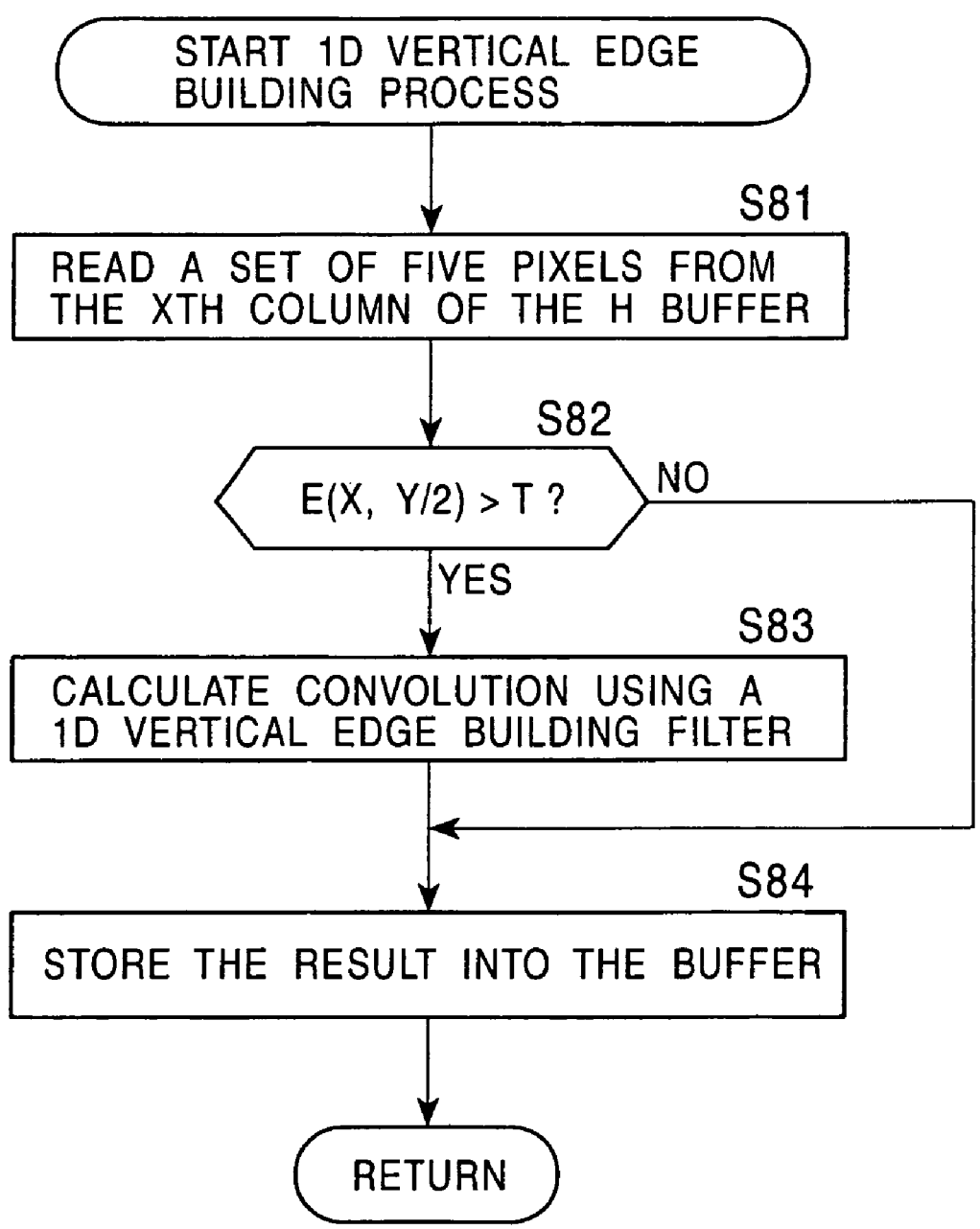
FIG. 17 is a flow chart illustrating a one-dimensional vertical edge building process performed in step S13 in FIG. 3.

Referring to the flow chart shown in FIG. 17, the details of the one-dimensional vertical edge building process are described below. This process is performed by a one-dimensional vertical edge builder 17.

First, in step S81, if a pixel(X, Y) satisfies the condition 1<X<2×In_width −3 and 1<Y<2×In_height −3, a set of five pixels including the pixel(X, Y) at the center thereof is extracted from the Xth column of the H buffer 31. Then, in step S82, it is determined whether the energy E(X, Y/2) of the pixel at the center of the set of five pixels is greater than the predetermined threshold value T. The energy E(X, Y/2) has been calculated in step S42 in FIG. 8 and stored in the energy map in step S43.

In the case where it is determined in step S82 that the energy E(X, Y/2) is greater than the threshold value T, the process proceeds to step S83 to calculate convolution using the one-dimensional vertical edge building filter. In step S84, the result of convolution is stored in a buffer.

In the case where it is determined in steps S82 that the energy E(X,Y/2) is equal to of smaller than the threshold value T, step S83 is skipped and the pixel (x, y) extracted in step S81 is directly stored in the buffer.

Figure 18:
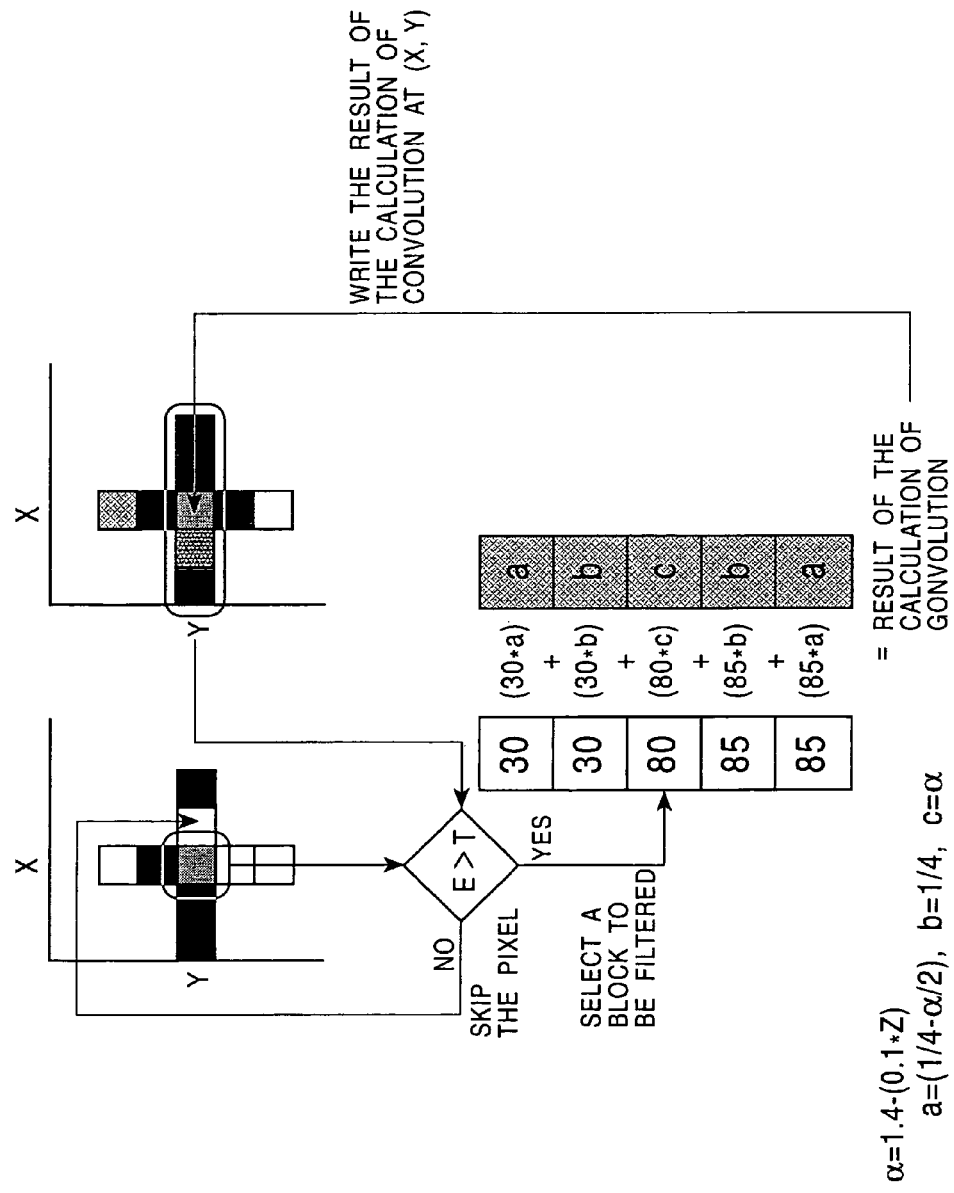
FIG. 18 is a diagram illustrating a convolution process performed in step S83 in FIG. 17.

FIG. 18 illustrates a specific example of the one-dimensional vertical edge building process. In this example, the energy E of the pixel at the center of the set of five pixels is read from the energy map, and, if the energy E is greater than the predetermined threshold value T, convolution is calculated using the one-dimensional vertical edge building filter. More specifically, in this example, the five values of five pixels are 30, 30, 80, 85, and 85, respectively, and the corresponding filter coefficients are a, b, c, b, and a, respectively. The respective values of a, b, and c are given by the following equations.

$$a = (\frac{1}{4} - \frac{1}{2})$$

$$b = \frac{1}{4}$$

$$c = \alpha$$

Thus, the convolution is given by the following equation.

Convolution=30a+30b+80c+85b+85a

The resultant convolution value is directly stored in a linear buffer corresponding to the pixel at the center of the set of five pixels.

Figure 19:
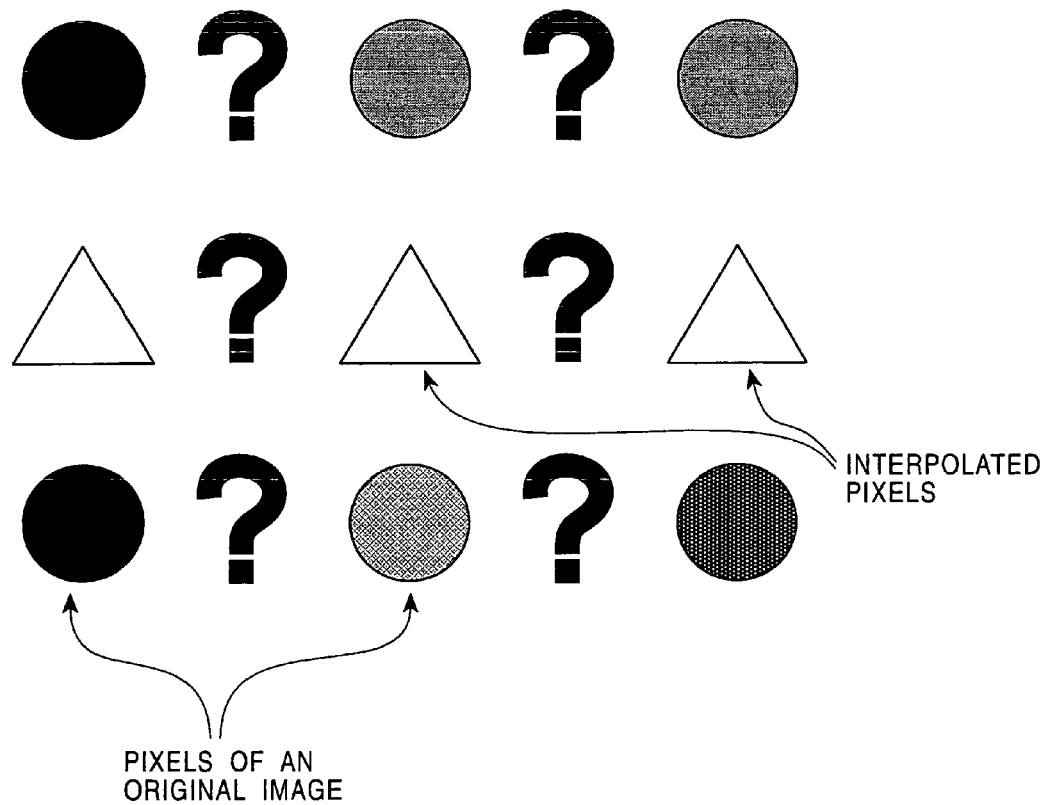
FIG. 19 is a flow chart illustrating a high-speed horizontal up sampling process performed in step S14 in FIG. 3.

Referring again to FIG. 3, after completing the one-dimensional vertical edge building process in step S13 as described above, the process proceeds to step S14 to perform a high-speed horizontal up sampling process. The high-speed horizontal up sampling process is performed by a high-speed horizontal up sampler 14. In this high-speed horizontal up sampling process, pixels are interpolated in the horizontal direction as shown in FIG. 19.

Figure 20:
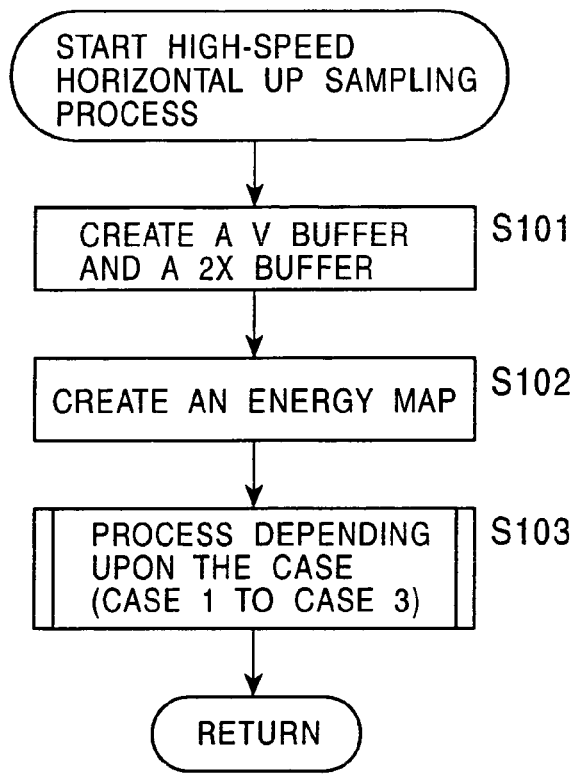
FIG. 20 is a flow chart illustrating the details of the high-speed horizontal up sampling process performed in step S14 in FIG. 3.
Figure 25:
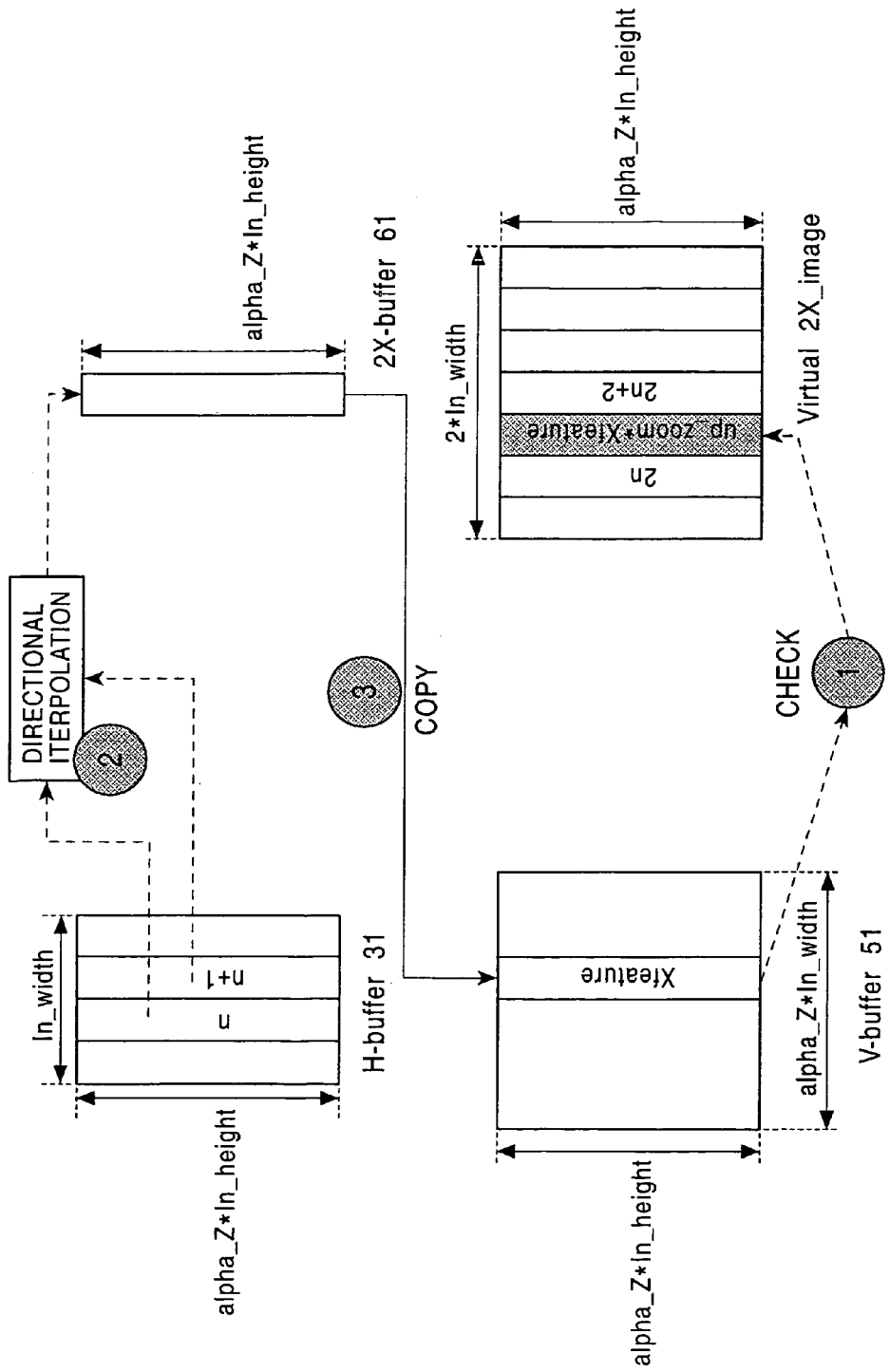
FIG. 25 is a diagram schematically illustrating the process in case 2 in FIG. 23.

FIG. 20 illustrates the details of the high-speed horizontal up sampling process. In step S101, the high-speed horizontal up sampler 14 creates a V buffer 51 (FIG. 22 which will be referred to later) and a 2X buffer 61 (FIG. 25 which will be referred to later). The V buffer 51 is created so as to have a size of (alpha_Z×In_width)×(alpha_Z×In_height), and the 2X buffer 61 is created so as to have a size of 1×(alpha_Z× In_height). In the 2X buffer 61, one column of data with a X coordinate (equal to an odd number) of a virtual image 2X_image enlarged in the horizontal direction by a factor of 2 is stored.

Thereafter, in step S102, an energy map with a size of In_width×(alpha_Z×In_height) is created. Then, in step S103, a process is performed depending upon the case (case 1 to case 3). Which process of cases 1 to 3 is performed is determined in accordance with the following equation.

2X_column=X×2/alpha_Z (10)

When the value of 2X_column calculated in accordance with the above equation is equal to an even integer (2X_column=2n where n is an integer), a case-1 process is performed. When the value of 2X_column calculated in accordance with the above equation is equal to an odd integer (2X_column=2n+1 where n is an integer), a case-2 process is performed. In the other case (when 2X_column is a real number), a case-3 process is performed.

Figure 21:
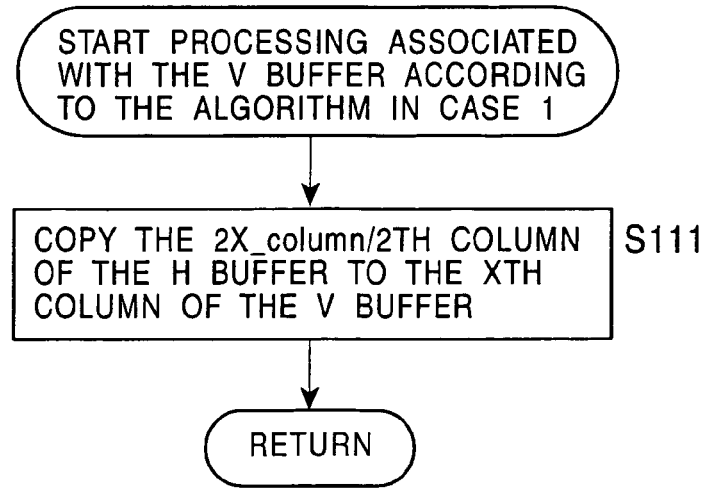
FIG. 21 is a flow chart illustrating a process performed, in case 1, in step S103 in FIG. 20.

In case 1, the process is performed in accordance with the flow chart shown in FIG. 21. In this case, a column with a column number of 2X_column=2n in the virtual image 2X_image enlarged in the horizontal direction by a factor of 2 corresponds to an already-calculated column with a column number of 2X_column/2=n of the H buffer 31. Thus, in this case, the high-speed horizontal up sampler 14 copies, in step S111, the column with the column number of the 2X_column/2 of the H buffer 31 to the column with the column number of X of the V buffer.

Figure 22:
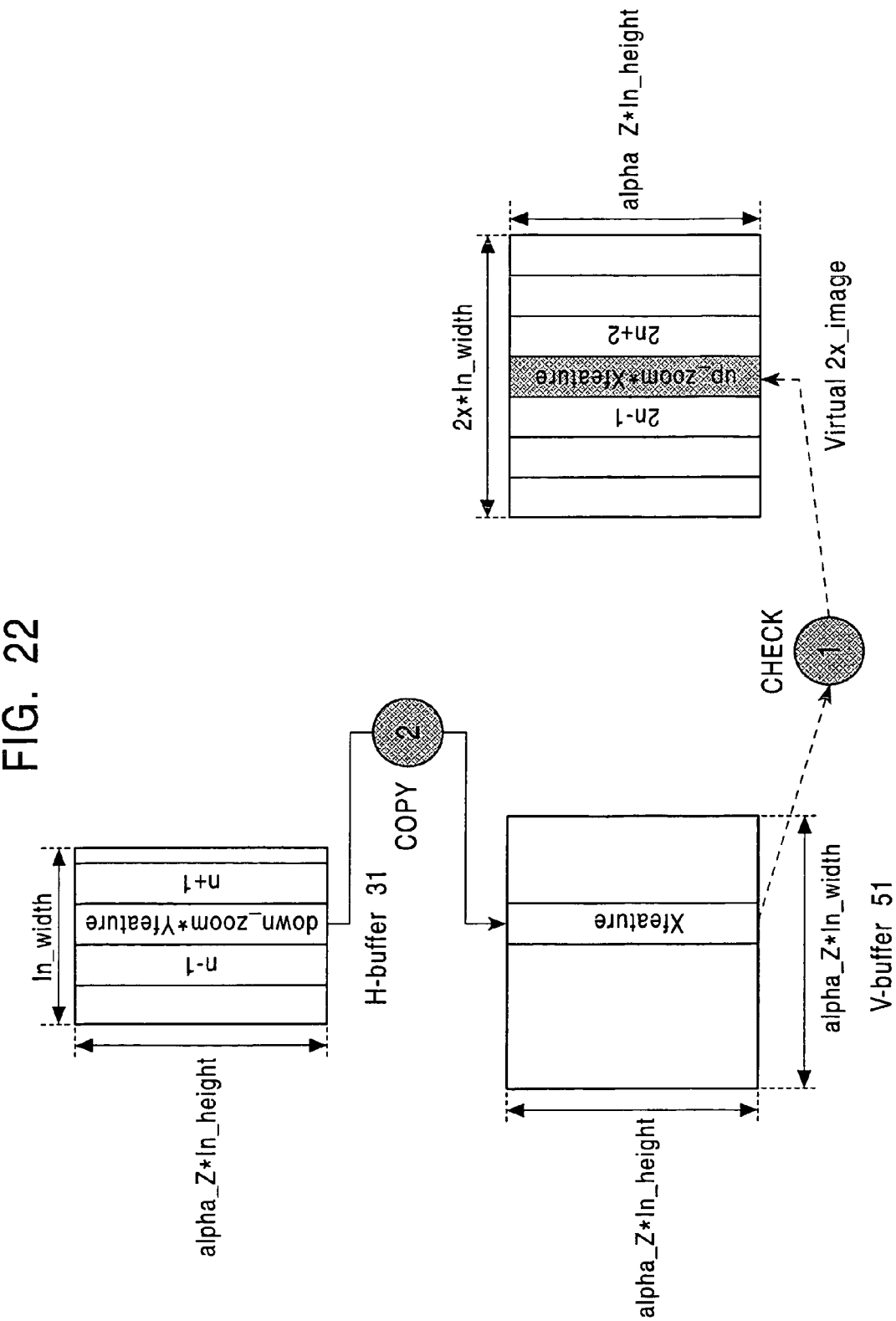
FIG. 22 is a diagram schematically illustrating the process performed in case 1 in FIG. 21.

FIG. 22 conceptually illustrates the process performed in case 1. When a 2nth column of the virtual image 2X_image enlarged in the horizontal direction by a factor of 2 corresponds to a nth column of the V buffer 51, the nth column of the H buffer 31 is copied to the Xth column of the V buffer 51.

Figure 23:
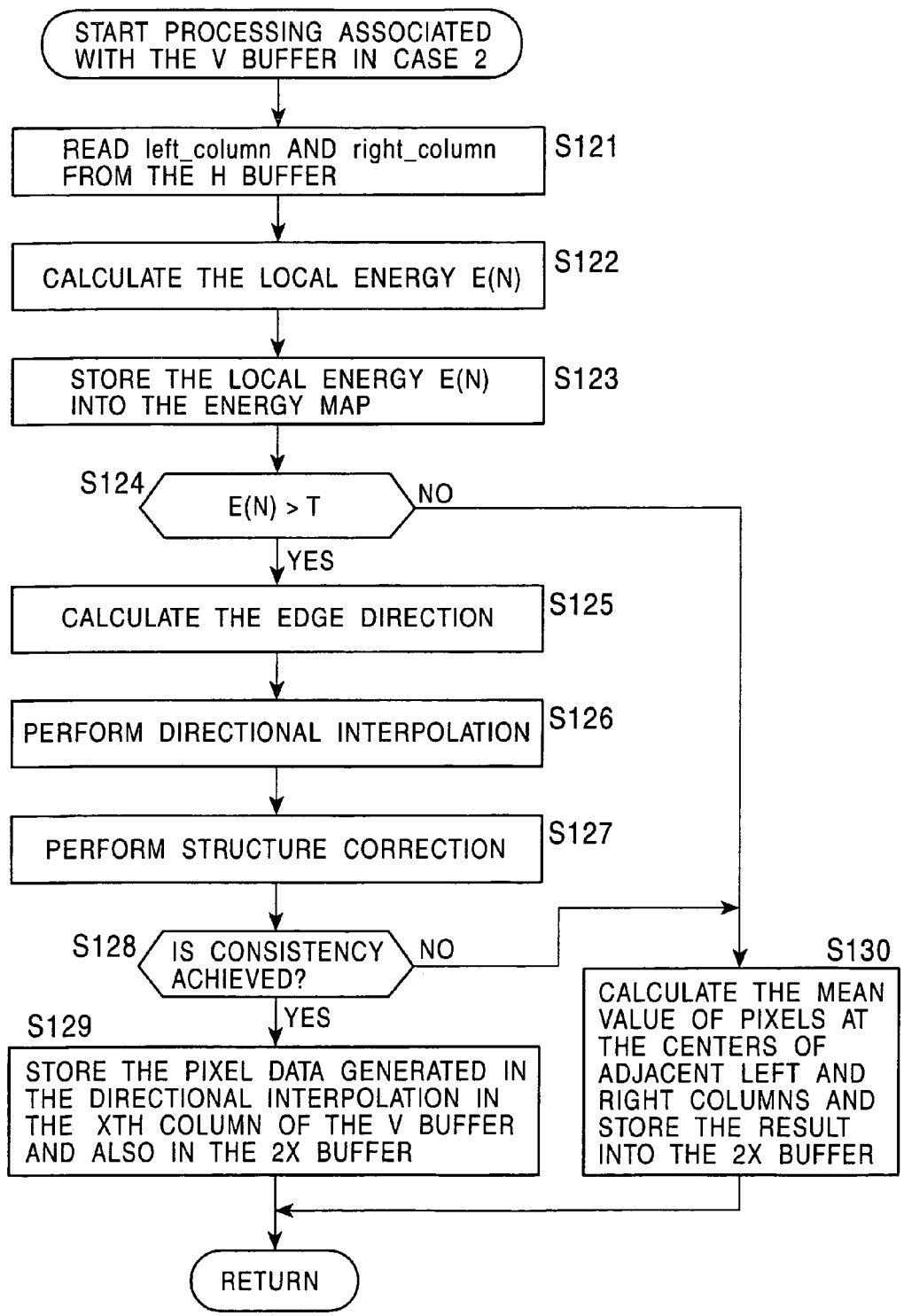
FIG. 23 is a flow chart illustrating a process performed, in case 2, in step S103 in FIG. 20.

FIG. 23 is a flow chart of a process associated with the V buffer 51, which is performed in step S103 shown in FIG. 20 in case 2. In case 2, although the Xth column of the V buffer 51 can correspond to a particular column with a column number of (2n+1) of the virtual image 2X_image enlarged in the horizontal direction by a factor of 2 but cannot correspond to any column of the H buffer 31.

In this case, in step S121, pixels (N pixels) in a left column (left_column) and a right column (right_column) within a predetermined area are extracted from the H buffer 31. The coordinates of the center point of the left column (left_column) are given as (n, Y+N/2), and the coordinates of the center point of the right column (right_column) are given as (n+1, Y+N/2).

Thereafter, in step S122, the local energy E(N) is calculated by subtracting, from the pixel values of respective pixels in the left column (left_column), the pixel values of the corresponding pixels at diagonal locations in the right column (right_column) and then calculating the sum of the absolute values of the differences. That is, in this process, the local energy E(N) is calculated in accordance with the following equation.

$E(N)=\Sigma_{I=0}^{N-1} ABS(\text{left\_column}(I)-\text{right\_column}(N-I-1))$ (11)

The calculated local energy E(N) is stored at coordinates (n, Y+N/2) in the energy map with a size of In_width× alpha_Z×In_height created in step S102.

Thereafter, in step S124, it is determined whether the energy E(N) is greater than a predetermined threshold value T. When the energy E(N) is equal to or smaller than the threshold value T, the area is regarded as a low-energy flat area including no edge. In this case, it is not needed to calculate the direction of a latent edge. Thus, the process proceeds to step S130 to perform linear interpolation in a standard manner. That is, the mean value of the pixel value at the center of the adjacent left column (left_column(N/2)) and the pixel value at the center of the adjacent right column (right_column(N/2)) is calculated and the resultant mean value is employed as the pixel value of a new pixel(X+N/2, Y), as shown in the following equation (that is, standard linear interpolation is performed).

V-buffer(X+N/2, Y)=0.5×(left_column(N/2)+ right_column(N/2)) (12)

In the case where it is determined in step S124 that the energy E(N) is greater than the threshold value T, the area is regarded as a high-energy area including a latent edge. Thus, in this case, the process proceeds to step S125, and the direction of the edge is calculated in accordance with the following equation.

Energy=ABS(left_column(N−x−1)−right_column(x)) (13)

Figure 24:
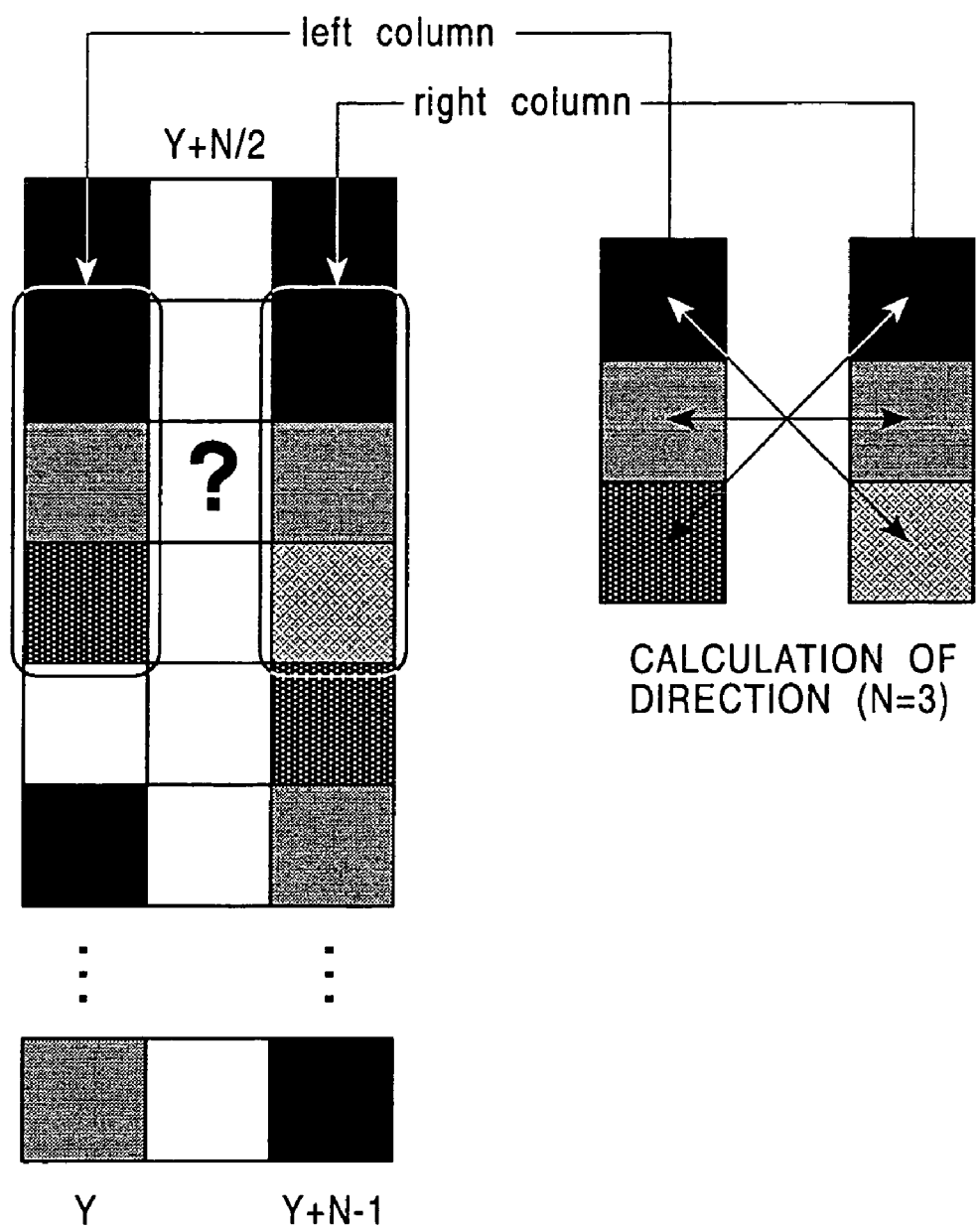
FIG. 24 is a diagram schematically illustrating the process in case 2 in FIG. 23.

The above calculation is performed repeatedly for various values of x such that the value of x is decremented from x=N−1 each time the calculation is performed until x becomes equal to or smaller than −1. More specifically, as shown in FIG. 24, the subtraction of the pixel value of a pixel in the right column from the pixel value of a corresponding pixel at a diagonal location in the left column is performed starting from the top of the right column.

Of the energy values calculated, the lowest energy value is selected, and the line between the two pixels associated with the selected lowest energy value is regarded to indicate the direction of the edge in the local area. Although N=3 in the example shown in FIG. 24, N may have a greater value to detect the edge direction more precisely from a greater number of candidates for directions.

In step S126, after determining the edge direction in step S125, a pixel is interpolated between the two pixels lying in the edge direction determined in step S125 by employing the mean value of the pixel values of these two pixels (that is, directional interpolation is performed). This makes it possible to perform interpolation while preserving the clearness and contrast of the original image without causing the image to be blurred which would occur in the standard line interpolation.

Thereafter, structure correction is performed in step S127. In this structure correction process, the relationship among a pixel interpolated at coordinates (X, Y+N/2) and pixels vertically adjacent that pixel, that is, pixels at coordinates left_column(N/2) and right_column(N/2) in the V buffer 51 is analyzed to check the consistency in terms of the local structure. To this end, the pixel value at the center of the left column is subtracted from the interpolated pixel value and the pixel value at the center of the right column is subtracted from the interpolated pixel value, and these two differences are multiplied with each other to obtain a value H(N/2) indicating the change in the horizontal direction, as shown in the following equation.

$$H(N/2)=(\text{left\_column}(N/2)-V\text{-buffer}(X+N/2,\ Y))\times \\ (V\text{-buffer}(X+N/2,\ Y)-\text{right\_column}(N/2)) \quad (14)$$

In step S128, it is determined, on the basis of the value H(N/2) calculated in step S127, whether consistency is achieved in the interpolated local structure. More specifically, the consistency is determined by checking whether the value H(N/2) is positive. In the case where the value H(N/2) is positive, the pixel value determined in step S126 by means of the directional interpolation is regarded as correct (consistent), and the pixel value is stored, in step S129, in the Xth column in the V buffer 51. The pixel value is also stored in the 2X buffer 61.

On the other hand, if it is determined in step S128 that the value H(N/2) is negative (consistency is not achieved), that value H(N/2) is negative (consistency is not achieved), that is, if it is determined that the pixel value created in step S126 by means of the directional interpolation is not adequate, the process proceeds to step S130 to perform linear interpolation in a standard manner as in the case where it is determined in step S124 that the energy E(N) is equal is equal to or smaller than the threshold value T. The pixel value is also stored in the 2X buffer 61.

FIG. 25 conceptually illustrates the above-described process performed in case 2. As shown in FIG. 25, when the Xth column of the V buffer 51 has a predetermined relationship with a particular column of the virtual image 2X_image enlarged in the horizontal direction by a factor of 2, the data created by means of the directional interpolation from the nth column and the (n+1)th column of the H buffer 31 is stored in the 2X buffer 61 and copied to the Xth column of the V buffer 51.

Referring to the flow chart shown in FIG. 26, a process associated with the V buffer, which is performed in step S103 in FIG. 20 in case 3, is described below.

In case 3, 2n<2X_column<2n+1 or 2n−1<2X_column<2n, that is, the values of the Xth column of the V buffer 51 do not correspond to the values of any column (2X_column) of the virtual image 2X_image enlarged in the horizontal direction by a factor of 2 and do not correspond to the values of any column of the H buffer 31.

In this case, it is determined, in step S141, whether the value of 2X_column is greater than 2n and smaller than 2n+1. If the value of 2X_column is greater than 2n and smaller than 2n+1, a Xth column of the V buffer 51 is created from the (2n+1)th column and the 2nth column of the virtual image 2X_image enlarged in the horizontal direction by a factor of 2.

In this case, in step S142, the high-speed horizontal up sampler 15 calculates the (2n+1)th column of the virtual image 2X_image enlarged in the horizontal direction by a factor of 2 from the adjacent upper 2nth column and the adjacent lower (2n+2)th column (the nth column and the (n+1)th column of the H buffer 31) in steps S121 to S130 in the flow chart in case 2 shown in FIG. 23. There is a possibility that the calculation result obtained in step S142 will be used in calculation of the next (n+1)th column of the V buffer 51, and thus, in step S143, the result is stored in the 2X buffer 61.

Then, in step S144, the Xth column of the V buffer 51 is calculated from the (2n+1)th column calculated in step S142 (and stored in the 2X buffer 61) and the 2nth column of the virtual image 2X_image enlarged in the horizontal direction by a factor of 2 (the nth column of the H buffer 31) in accordance with the following equation, and the result is stored in the Xth column of the V buffer 51.

$$V\text{-buffer}(X,\ Y)=(2X\_\text{column}-2n)\times 2X\text{-buffer}(X)+ \\ (2n+1-2X\_\text{column})\times I\_\text{image}(n,\ Y) \quad (15)$$

In the case where it is not determined in step S141 that 2X_column is greater than 2n and smaller than 2n+1 (in the case where it is determined that 2X_column is greater than 2n−1 and smaller than 2n), a Xth column of the V buffer 51 is created from the (2n−1)th column and the 2nth column of the virtual image 2X_image enlarged in the horizontal direction by a factor of 2. Herein, there is a possibility that the (2n−1)th column has already been calculated and stored in the 2X buffer 61 when the previous column of the V buffer 51 was determined. Thus, in step S145, it is determined whether the (2n−1)th column has already been stored in the 2X buffer 61. If it already exists in the 2X buffer 61, the (2n−1)th column is read, in step S148, from the 2X buffer 61.

On the other hand, if it is determined in step S145 that the data of the (2n−1)th column does not exist in the 2X buffer 61, the process proceeds to step S146 to calculate the (2n−1)th column of the virtual image 2X_image enlarged in the horizontal direction by a factor of 2 using the upper (2n−2)th column and the lower 2nth column (the (n−1)th column and the nth column of the H buffer 31) in a similar manner to steps S121 to S130 in the flow in case 2 shown in FIG. 23. There is a possibility that the values of the (2n−1)th column calculated in step S146 will be used in calculation of the next (X+1)th column of the V buffer 51, and thus, in step S147, the calculation result is stored in the 2X buffer 61.

After completion of step S147 or step S148, the process proceeds to step S149. In step S149, the Xth column of the V buffer 51 is interpolated from the obtained (2n−1)th column and the 2nth column virtual image 2X_image enlarged in the horizontal direction by a factor of 2 (the nth column of the H buffer 31) in accordance with the following equation.

$$V\text{-buffer}(X,\ Y)=(2n-2X\_\text{column})\times 2X\text{-buffer}(Y)+ \\ (2X\_\text{column}-(2n-1))\times I\_\text{image}(n,\ Y) \quad (16)$$

The above calculation is performed repeatedly while incrementing the value of Y starting from Y=0 until the value of Y becomes equal to or greater than In_height× alpha_Z.

In order to calculate undetermined pixel values of columns of the V buffer 51, a similar calculation is performed repeatedly for coordinates (X, Y+N/2) which satisfy the following conditions: −1<Y<alpha_Z×In_height−N+1 and −1<Y<alpha_Z×In_width−1.

In case 3, as described above, weighted interpolation is performed using the 2nth column and the (2n+1)th column, or the (2n−1)th column and the 2nth column of the virtual image 2X_image enlarged in the horizontal direction by a factor of 2.

Figure 26:
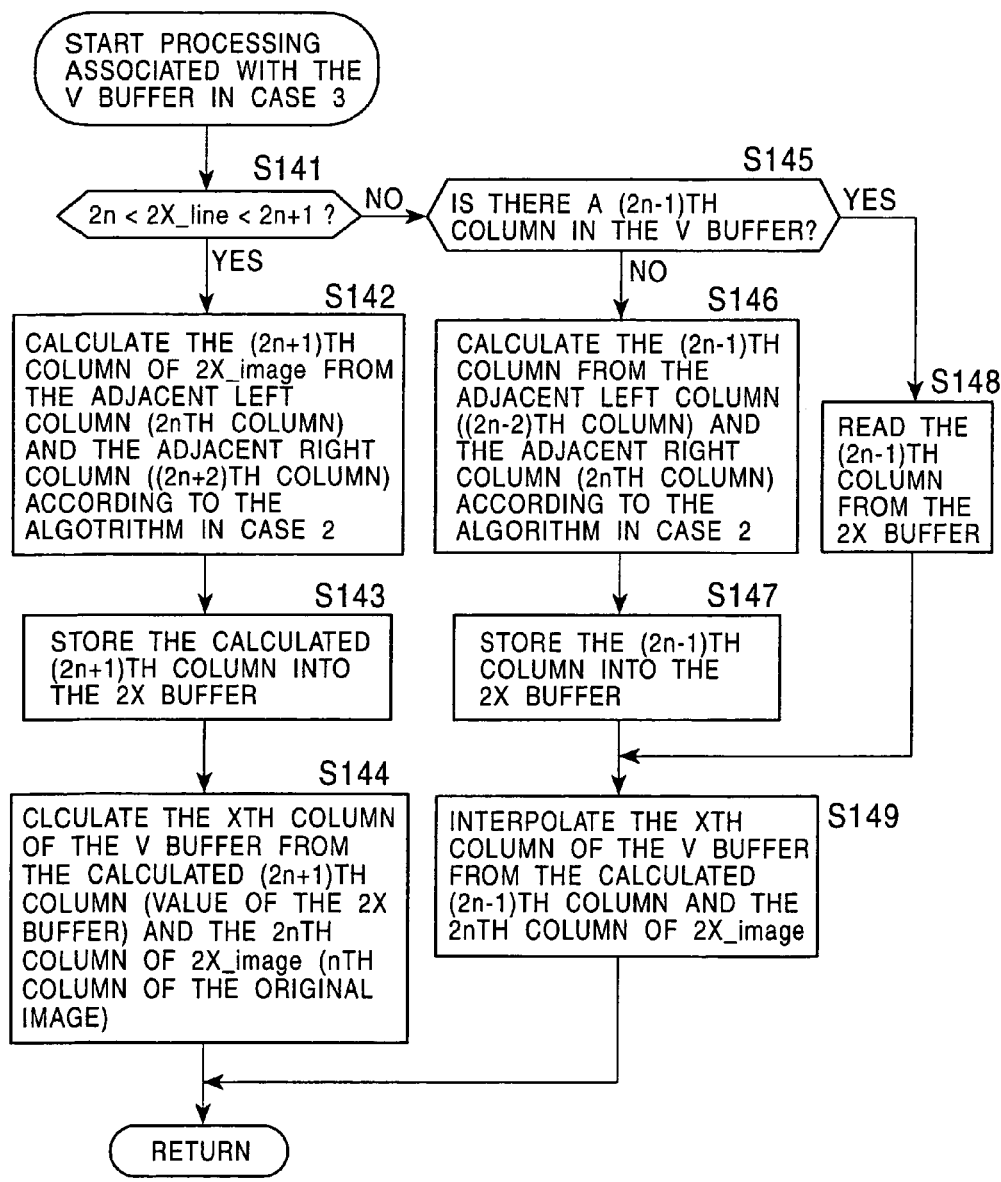
FIG. 26 is a flow chart illustrating a process performed, in case 3, in step S103 in FIG. 20.
Figure 27:
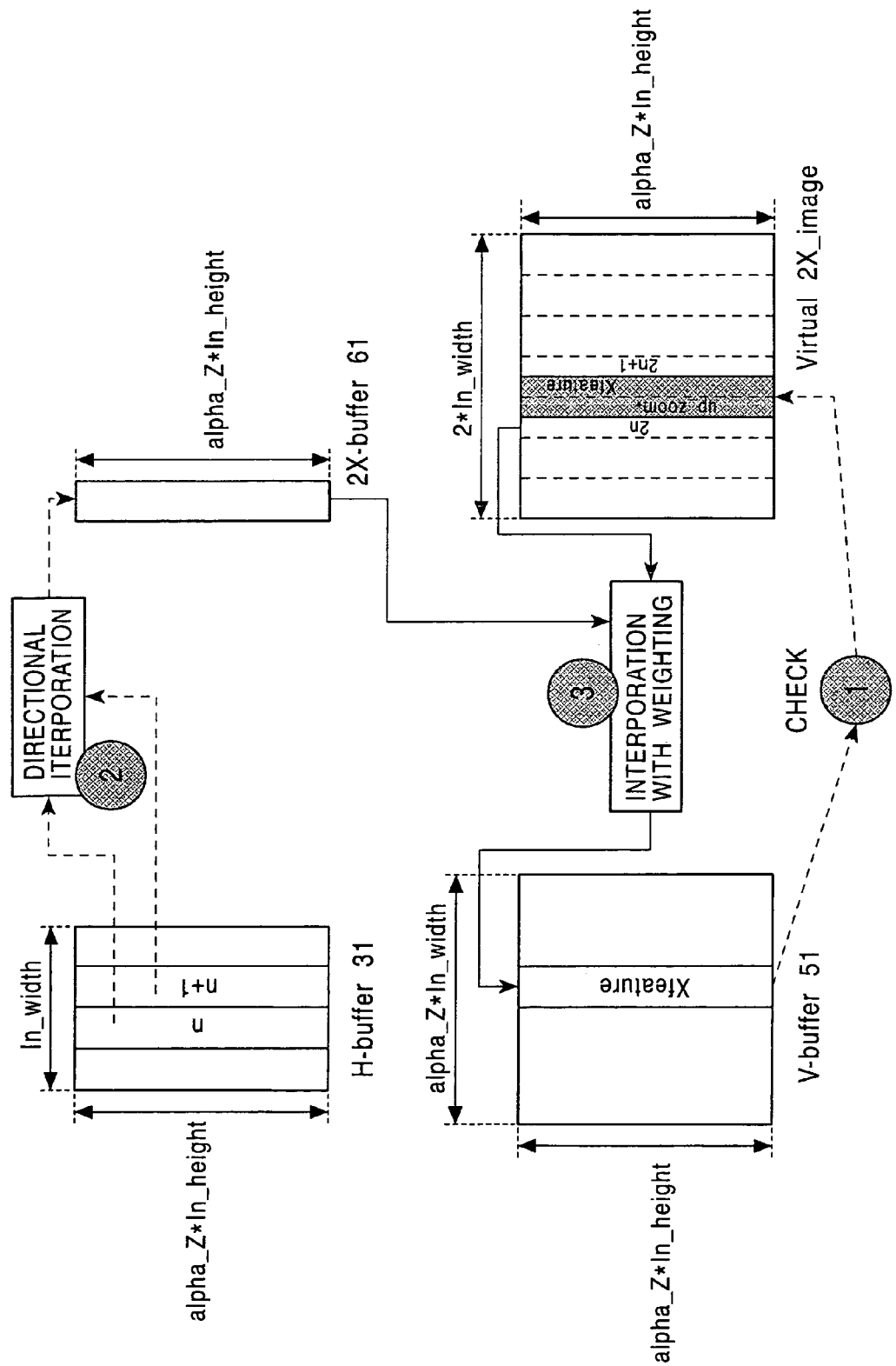
FIG. 27 is a diagram schematically illustrating the process in case 3 in FIG. 26.

FIG. 27 schematically illustrates the process in case 3 shown in FIG. 26. When the Xth column of the V buffer 51 has a predetermined relationship with a particular column of the virtual image 2X_image enlarged in the horizontal direction by a factor of 2, a (2n+1)th column or (2n−1)th column is created by means of the directional interpolation from the nth column and the (n+1)th column of the original image I_image, and the created column is stored in the 2X buffer 61. Then the Xth column of the V buffer 51 is created by means of weighted interpolation from the value stored in the 2X buffer 61 and the data in the 2nth column of the virtual image 2X_image enlarged in the horizontal direction by a factor of 2.

Referring again to FIG. 3 after completing the high-speed horizontal up sampling process in step S14 in the above-described manner, the process proceeds to step S15 to perform the one-dimensional horizontal edge building process.

Referring to the flow chart shown in FIG. 28, the details of the one-dimensional horizontal edge building process are described below. This process is performed by the one-dimensional horizontal edge builder 18.

First, in step S161, if a pixel(X, Y) satisfies the conditions 1<X<2×In_width−3 and 1<Y 2×In_height−3, a set of five pixels including the pixel(X, Y) at the center thereof is extracted from the Yth row of the V buffer 51. Thereafter, in step S162, it is determined whether the energy E(X/2, Y) of the pixel at the center of the set of five pixels is greater than a predetermined threshold value T. The energy E(X/2, Y) has been calculated in step S122 in FIG. 23 and stored in the energy map in step S123.

In the case where it is determined in step S162 that the energy E(X/2, Y) is greater than the threshold value T, the process proceeds to step S163 to calculate convolution using the one-dimensional horizontal edge building filter. In step S164, the result of convolution is stored in a buffer.

In the case where it is determined in step S162 that the energy E(X/2, Y) is equal to or smaller than the threshold value T, step S163 is skipped and the pixel (x, Y) extracted in step S161 is directly stored in the buffer.

Figure 28:
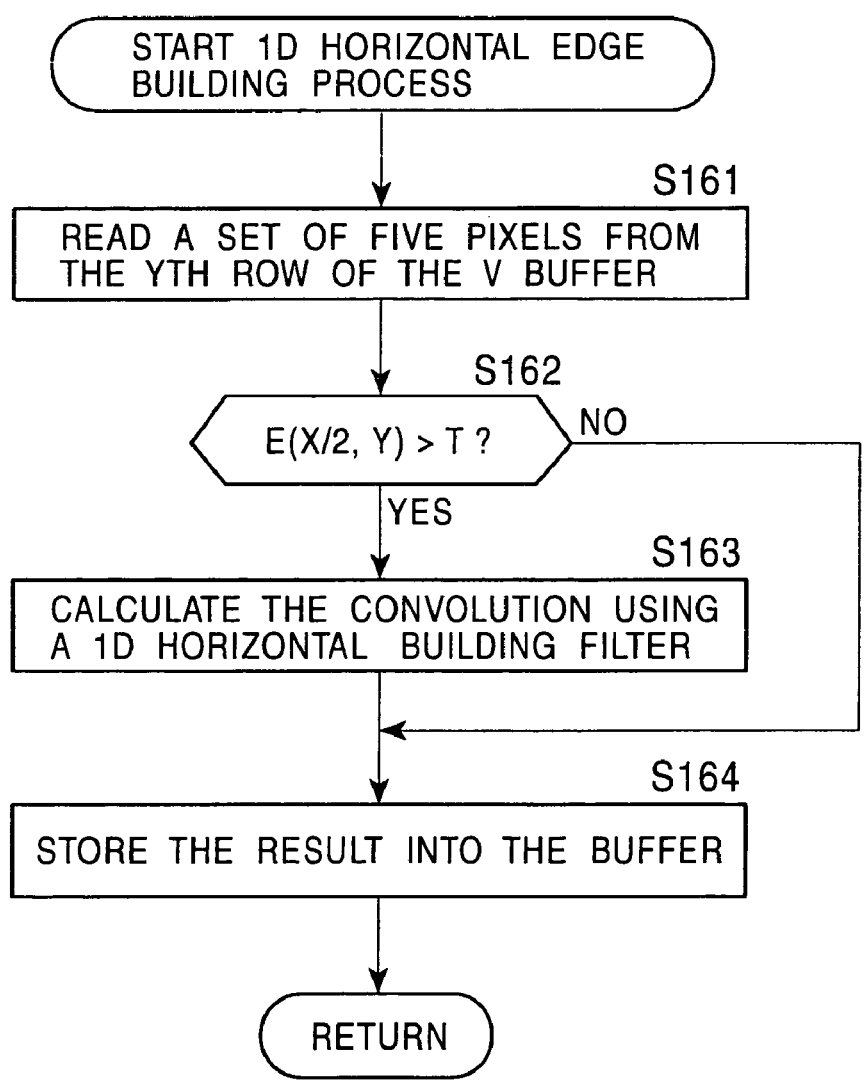
FIG. 28 is a flow chart illustrating a one-dimensional horizontal edge building process performed in step S15 in FIG. 3.
Figure 29:
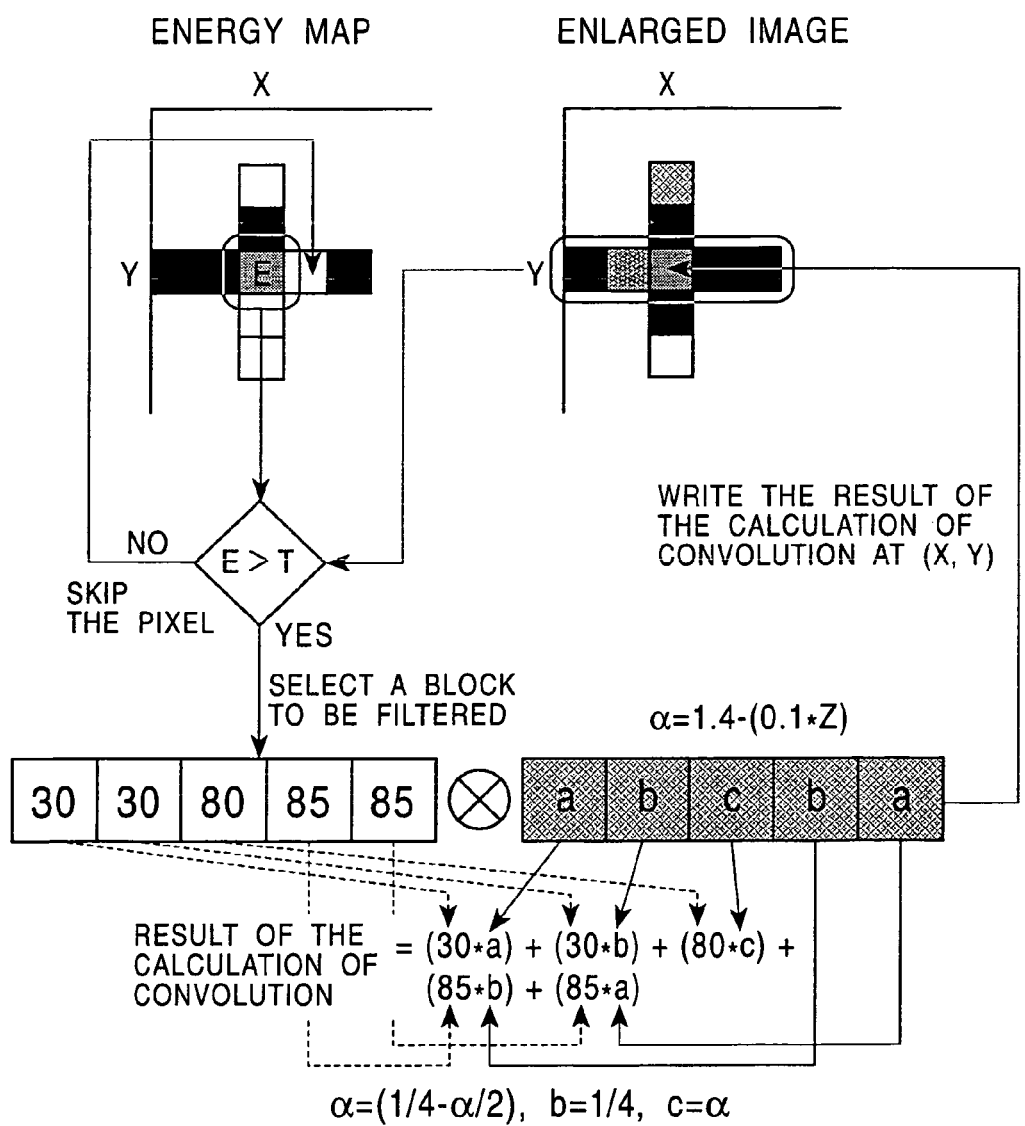
FIG. 29 is a diagram illustrating a convolution process performed in step S163 in FIG. 28.

FIG. 29 illustrates a specific example of the one-dimensional horizontal edge building process shown in FIG. 28. In the case where the energy E(X/2, Y) of the five pixels in the Yth row is greater than the predetermined threshold value T, convolution is calculated using the one-dimensional horizontal edge building filter. More specifically, in this example, the five values of five pixels are 30, 30, 80, 85, and 85, respectively, and the corresponding filter coefficients are a, b, c, b, and a, respectively. Thus, the convolution is given by the following equation.

Convolution=30$a$+30$b$+80$c$+85$b$+85$a$

The respective values of a, b, and c are given by the following equations.

$a = \frac{1}{4} - \frac{1}{2}$ $b = \frac{1}{4}$ $c = \alpha$

Figure 30:
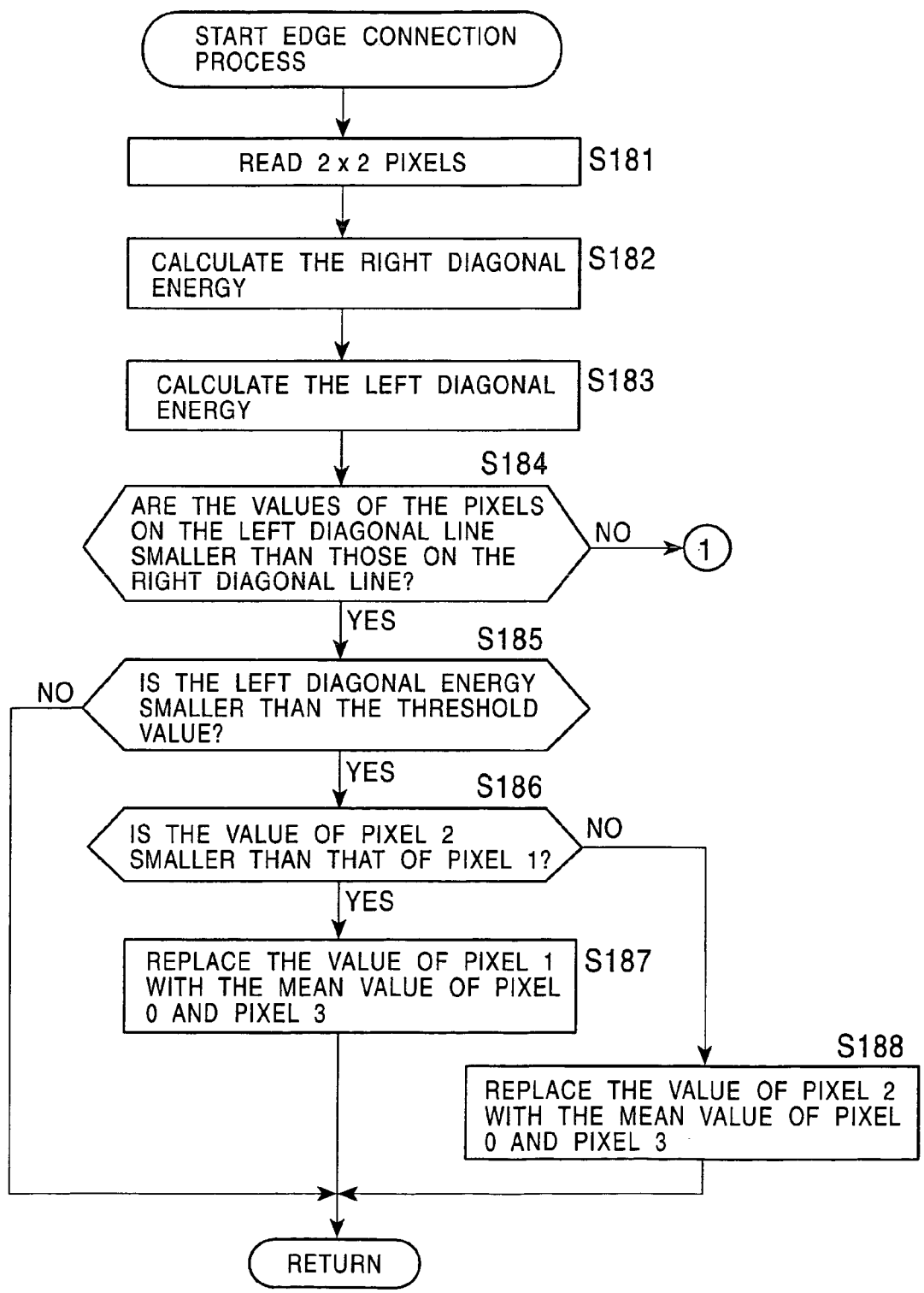
FIG. 30 is a flow chart illustrating the details of the edge connecting process in step S16 in FIG. 3.
Figure 31:
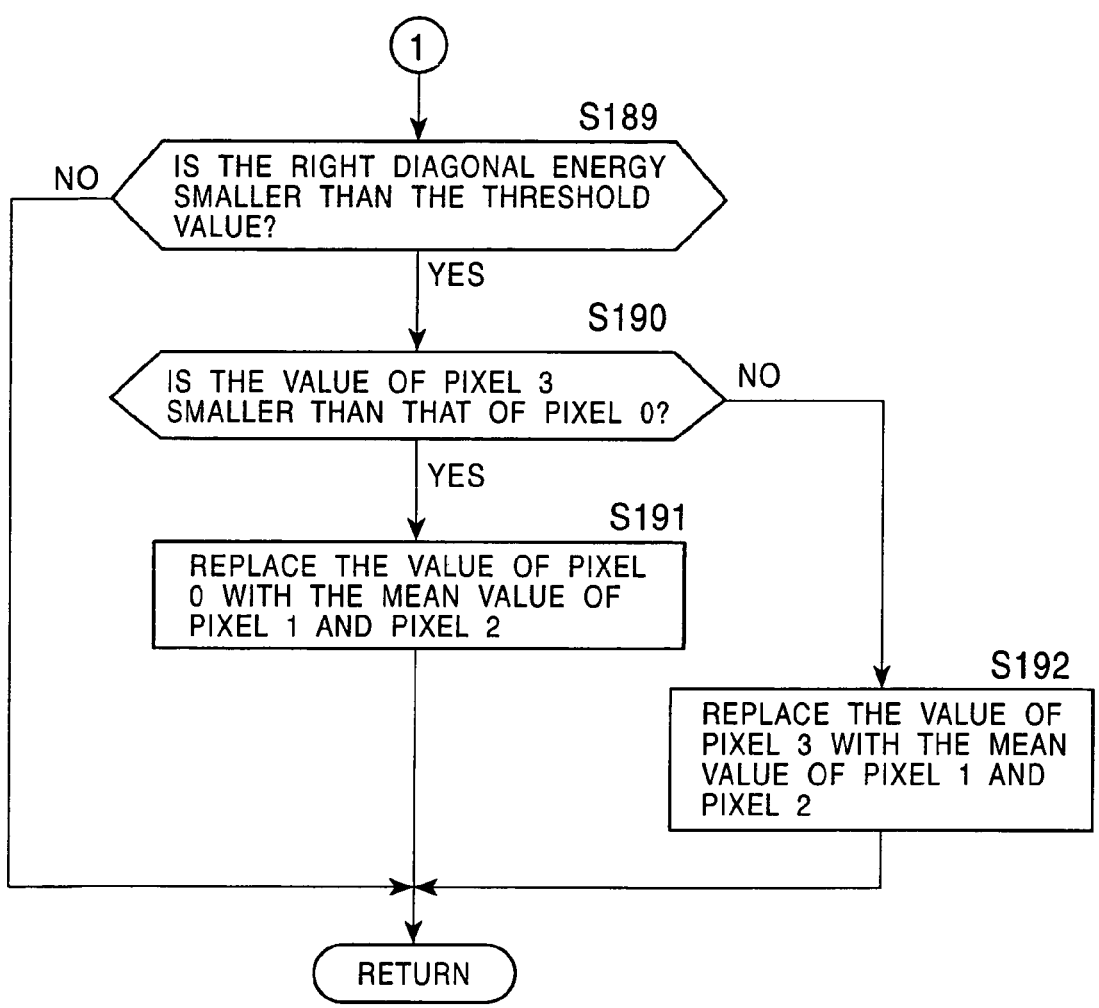
FIG. 31 is a flow chart illustrating the details of the edge connecting process in step S16 in FIG. 3.

As described above, in the case where it is determined in step S11 that the image mode is specified, steps S12 to S15 are performed. On the other hand, if it is determined in step S11 that the specified mode is not the image mode (for example, in the case where a loose connection image such as an icon used in a computer or a font used in a word processor is processed), an edge connecting process is performed in step S16 before performing the steps S12 to S15. The details of the edge connecting process are shown in FIGS. 30 and 31. The edge connecting process is performed by the edge connector 11.

Figure 32A:
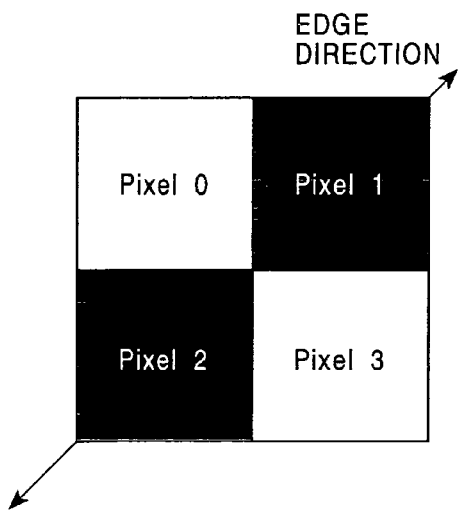
FIG. 32, consisting of FIGS. 32A to 32B, is a diagram illustrating the right and left diagonal energy calculated in steps 182 and S183 in FIG. 30.
Figure 32B:
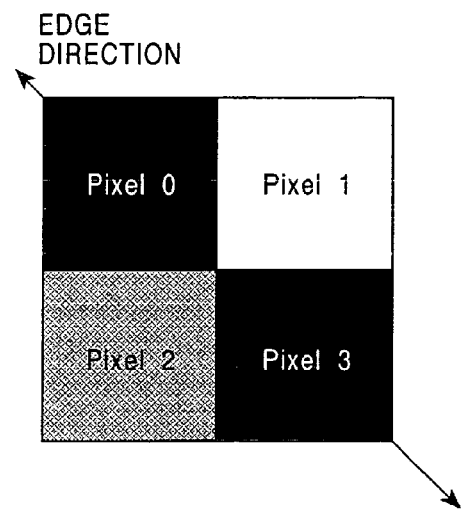

First, in step 181, 2×2 pixels corresponding to a particular pixel(X, Y) are extracted. Thereafter, right diagonal energy and left diagonal energy are calculated in steps S182 and S183, respectively. The right diagonal energy is calculated by subtracting the pixel value of a lower left pixel of the 2×2 pixels from the pixel value of an upper right pixel, and the left diagonal energy is calculated by subtracting the pixel value of a lower right pixel from the pixel value of an upper left pixel. For example, when a pixel 0 in FIG. 32A is given as the pixel(X, Y), the right diagonal energy is determined by subtracting the pixel value of a pixel 2 from the pixel value of the pixel 1 as shown in FIG. 32A, and the left diagonal energy is determined by subtracting the pixel value of a pixel 3 from the pixel value of the pixel 0 as shown in FIG. 32B.

Thereafter, in step S184, it is determined whether the pixel values of pixels on the left diagonal line are smaller than those on the right diagonal line. In the example shown in FIG. 32, it is determined whether the pixel values of the pixel 0 and the pixel 3 are smaller than those of the pixel 1 and the pixel 2.

In the case where it is determined in step S184 that the pixel values of the pixels on the left diagonal line are smaller than those on the right diagonal line, the process proceeds to step S185 to further determine whether the left diagonal energy calculated in step S183 is smaller than a predetermined threshold value. If the left diagonal energy is smaller than the threshold value, the process proceeds to step S186 to determine whether the pixel value of the pixel 2 is smaller than that of the pixel 1. If the pixel 2 has a smaller pixel value than the pixel 1, the process proceeds to step S187 and the pixel value of the pixel 1 is replaced with the mean value of the pixel values of the pixel 0 and pixel 3. In the case where it is determined in step S186 that the pixel value of the pixel 2 is not smaller than that of the pixel 1 (the pixel value of the pixel 2 is equal to or greater than that of the pixel 1), the process proceeds to step S188 and the pixel value of the pixel 2 is replaced with the mean value of the pixel values of the pixel 0 and the pixel 3.

Figure 33A:
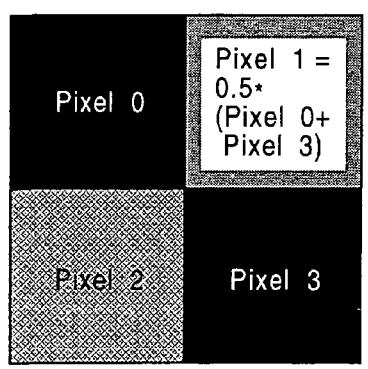
FIG. 33, consisting of FIGS. 33A to 33B, is a diagram illustrating the process performed in step S187 shown in FIG. 30 and the process performed in step S192 shown in FIG. 31.

FIG. 33A illustrates an example in which the pixel value of the pixel 1 is replaced with the mean value of the pixel values of the pixel 0 and the pixel 3 via the step S187.

In the case where it is determined in step S185 that the left diagonal energy is equal to or greater than the threshold value, steps S186 to S188 are skipped.

In the case where it is determined in step S184 that the pixel values of the pixel lying on the left diagonal line are not smaller than those of the pixels lying on the right diagonal line (the pixel values of the pixel lying on the left diagonal line are equal to or greater than those of the pixels lying on the right diagonal line), the process proceeds to step S189 to determine whether the right diagonal energy calculated in step S182 is smaller than the predetermined threshold value. If the right diagonal energy is smaller than the threshold value, the process proceeds to step S190 to further determined whether the pixel value of the pixel 3 is smaller than that of the pixel 0. If the pixel 3 has a smaller pixel value than the pixel 0, the process proceeds to step S191 and the pixel value of the pixel 0 is replaced with the mean value of the pixel 1 and the pixel 2. In the case where it is determined in step S190 that the pixel value of the pixel 3 is not smaller than that of the pixel 0 (the pixel value of the pixel 3 is equal to or greater than that of the pixel 0), the process proceeds to step S192 and the pixel value of the pixel 3 is replaced with the mean value of the pixel values of the pixel 1 and the pixel 2.

Figure 33B:
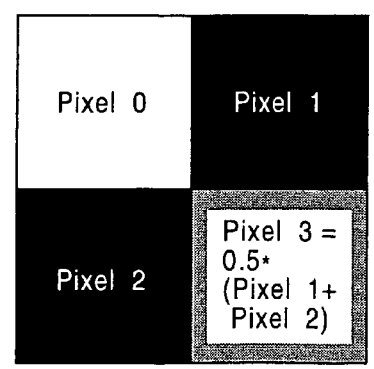

FIG. 33B illustrates an example in which the pixel value of the pixel 3 is replaced with the mean value of the pixel values of the pixel 1 and the pixel 2 via the step S192.

In the case where it is determined in step S189 that the right diagonal energy is not smaller than the threshold value, steps S190 to S192 are skipped.

By performing the edge connecting process described above, it is possible to thicken a loosely connected edge such as that of an icon or a font so as to have a strong edge structure. For example, when an edge locally includes a loose connection formed of pixels lying on only two diagonal lines as shown in FIG. 32, there is a possibility that when an edge direction is detected by means of the edge direction calculation process in step S45 shown in FIG. 8 or the process in step S125 shown in FIG. 23, the edge direction is detected in a significantly wrong manner. Such incorrect detection of the edge direction can cause the continuity of the edge to be destroyed. This problem can be effectively avoided by performing the edge connecting process described above.

Figure 2:
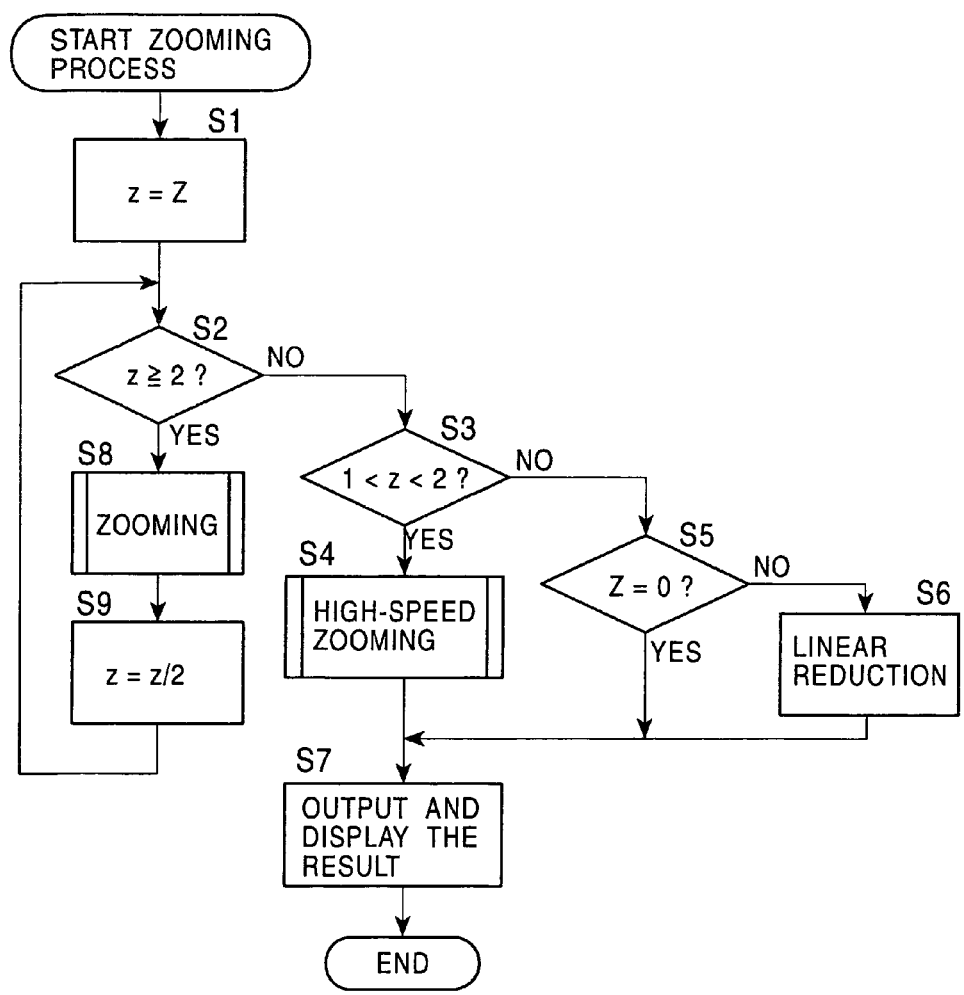
FIG. 2 is a flow chart illustrating a zooming process performed by the image processing apparatus shown in FIG. 1.

The zooming process in step S8 in FIG. 2 is described below. The details of the zooming process are shown in the flow chart in FIG. 34. Steps S211 to S215 in FIG. 34 are basically similar to steps S11 to S15 in the high-speed zooming process shown in FIG. 3.

Figure 34:
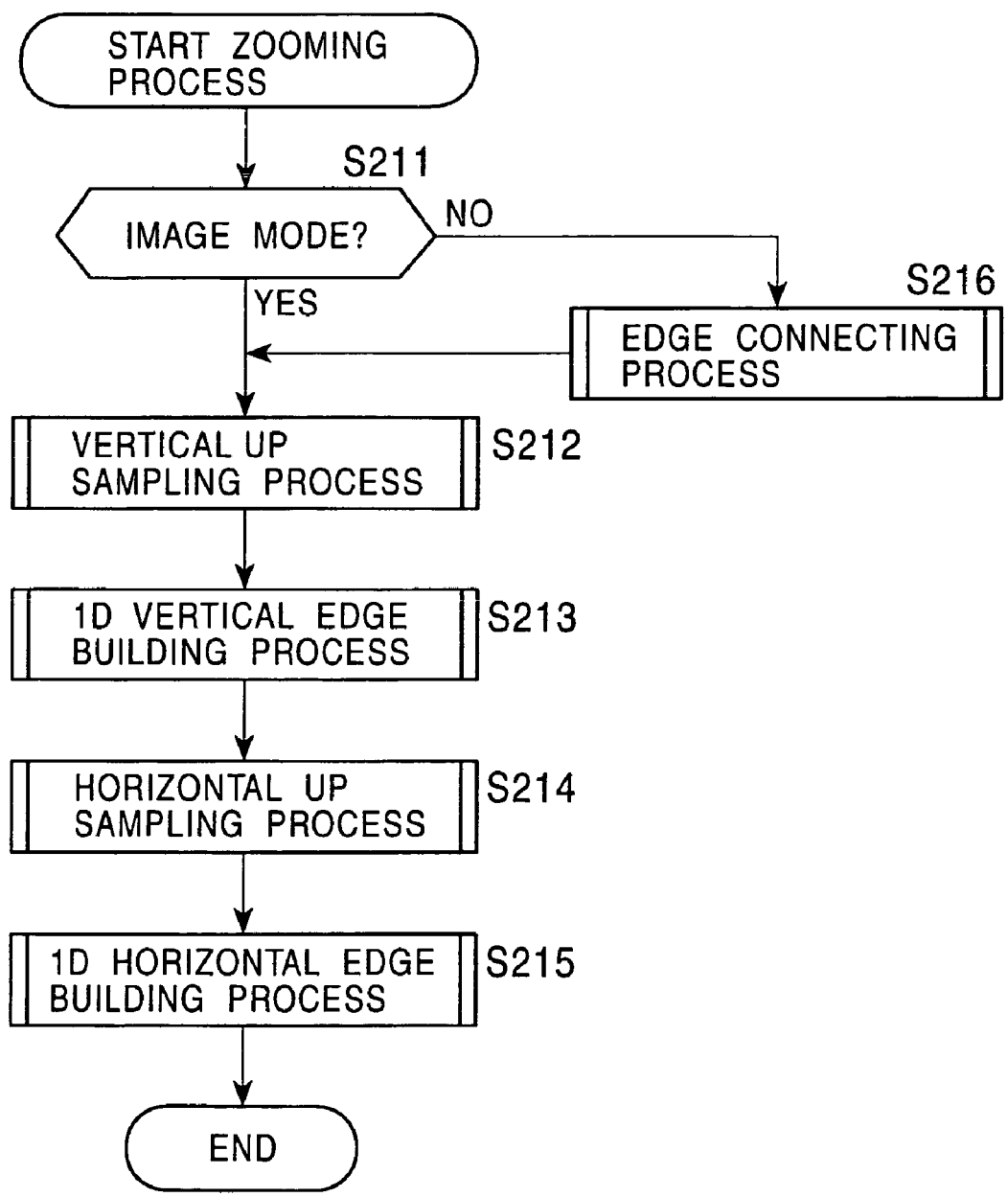
FIG. 34 is a flow chart illustrating the zooming process performed in step S8 in FIG. 2.

In FIG. 34, an edge connecting process in step S216, a one-dimensional vertical edge building process in step S213, and a one-dimensional horizontal edge building process in step S215, are similar to the edge connecting process in step S16, the one-dimensional vertical edge building process in step S13, and the one-dimensional horizontal edge building process in step S15, respectively, in FIG. 3 and thus they are not described in further detail herein. Herein, only a vertical up sampling process in step S212 and a horizontal up sampling process in step S214 are described.

Figure 35:
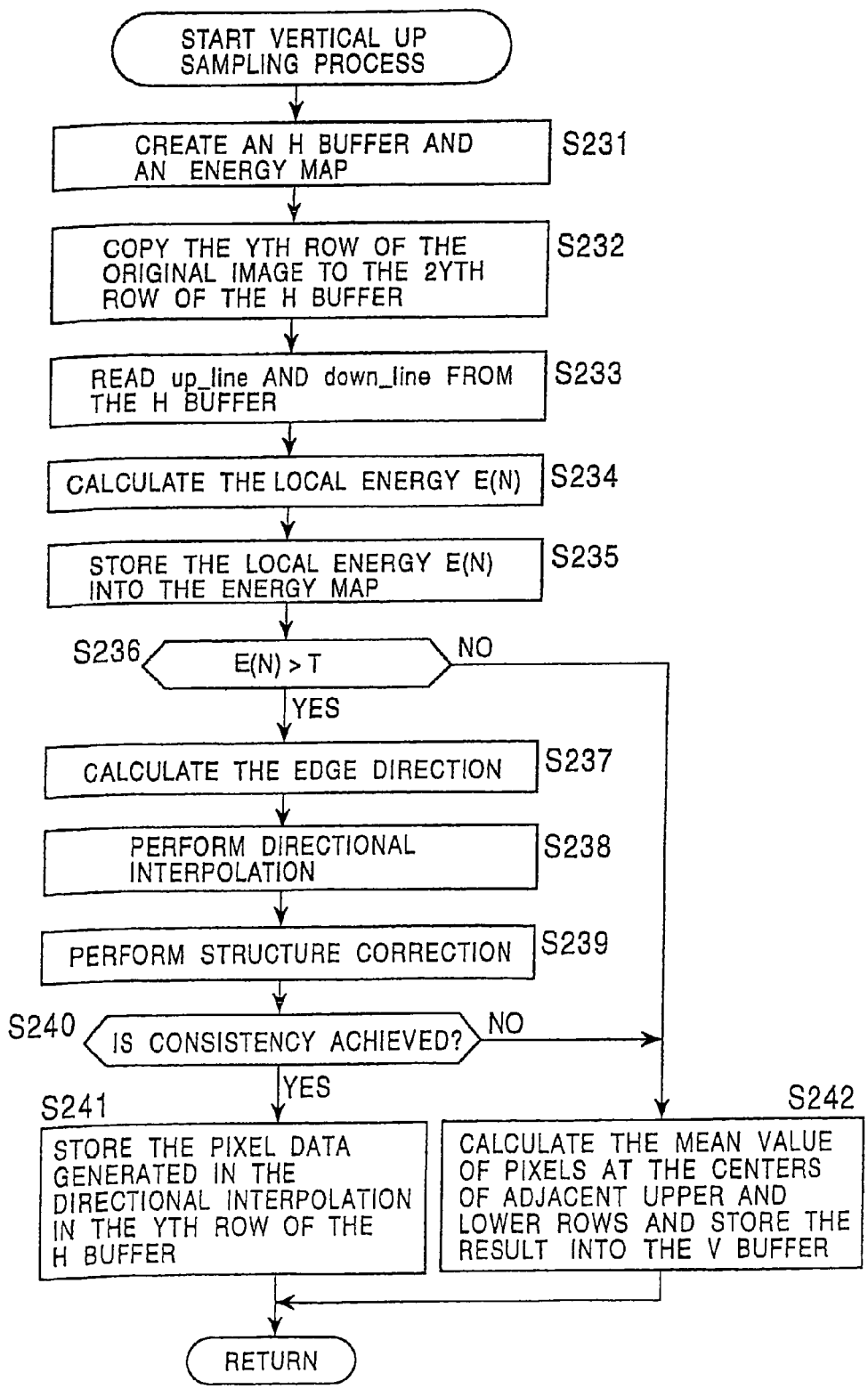
FIG. 35 is a flow chart illustrating a vertical up sampling process performed in step S212 in FIG. 34.

First, referring to the flow chart shown in FIG. 35, the vertical up sampling process in step S212 is described. This vertical up sampling process is performed by the vertical up sampler 13.

Figure 36:
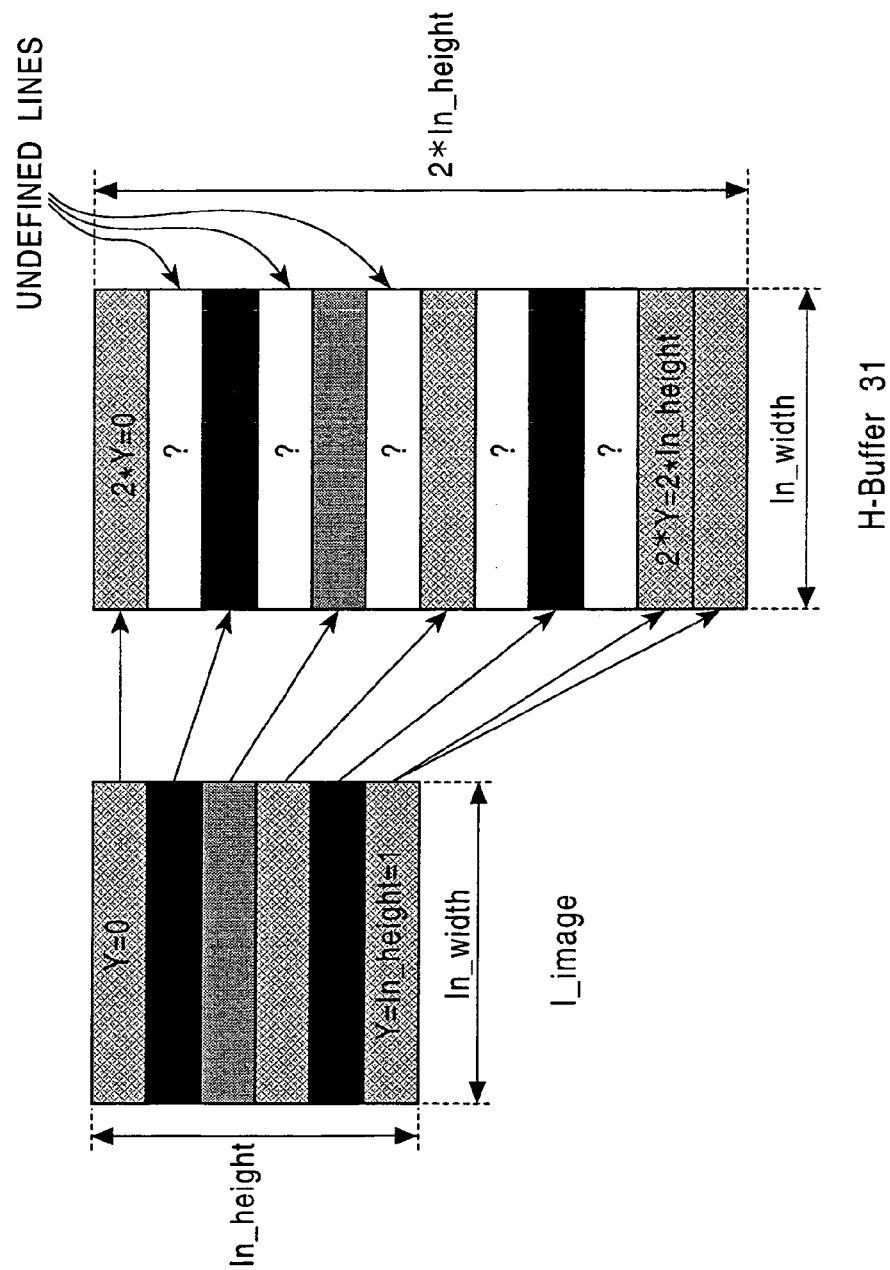
FIG. 36 is a diagram schematically illustrating the vertical up sampling process shown in FIG. 35.

First, in step S231, a H buffer 31 is created. Herein, the H buffer 31 is created so as to have a size of In_width×(2× In_height). At the same time, an energy map with the same size as the H buffer 31 is also created. Thereafter, in step S232, as shown in FIG. 36, the Yth row of the original image I_image is copied to the 2Yth row of the H buffer 31. In the last row of the H buffer 31, the last row of the original image I_image is copied.

Then, in step S233, N pixels of an upper row (up_line) and N pixels of a lower row (down_line) are extracted from the original image I_image. Herein, the center coordinates of the upper row (up_line) are given as (X+N/2, n) and the center coordinates of the lower row (down_line) are given as (X+N/2, n+1).

Thereafter, in step S234, local energy E(N) is calculated in accordance with the following equation.

$$E(N) = \Sigma_{I=0:N-1} ABS(\text{up\_line}(I) - \text{down\_line}(N-I-1)) \quad (17)$$

In the above calculation according to equation (17), the pixel values of the respective pixels in the upper row (up_line) are reduced by amounts of the pixel values of the corresponding pixels at the diagonal locations in the lower row (down_line), and the sum of the absolute values of those differences is determined.

In step S235, the vertical up sampler 13 stores the local energy E(N) calculated in step S234 at coordinates (X+N/2, n) of the energy map created in step S231. The local energy will be used in the one-dimensional vertical edge building process step S213 as will be described later.

In step S236, the high-speed vertical up sampler 13 determines whether the local energy E(N) is greater than a predetermined threshold value T. When the local energy E(N) is equal to or smaller than the threshold value T, the area is regarded as a low-energy flat area including no edge. In this case, it is not needed to calculate the direction of a latent edge, and thus process proceeds to step S242. In step S242, the vertical up sampler 13 determines the pixel data at coordinates (X+N/2, Y) in the H buffer 31 by employing, as the value thereof, the mean value of the pixel at the center of the adjacent upper row (up_line(N/2)) and that of the adjacent lower line down_line(N/2). The resultant pixel data is stored at coordinates (X+N/2, Y) in the H buffer 31. That is, in step S242, linear interpolation is performed in a standard manner in accordance with the following equation.

$$H\_buffer(X+N/2, Y) = 0.5 \times (\text{up\_line}(N/2) + \text{down\_line}(N/2)) \quad (18)$$

In the case where it is determined in step S236 that the local energy E(N) is greater than the threshold value T, the area is regarded as a high-energy area including a latent edge. In this case, the process proceeds to step S237 to attempt to calculate the possible direction of the edge. More specifically, the following calculation is performed repeatedly starting from x=N-1 until x becomes equal to or smaller than -1.

$$\text{Energy} = ABS(\text{up\_line}(N-x-1) - \text{down\_line}(x)) \quad (19)$$

Of the energy values calculated in accordance with equation (19), the lowest energy value is selected, and the line between the two pixels associated with the selected lowest energy value is regarded to indicate the direction of the edge in the local area.

If the edge direction is detected in step S237, then interpolation (directional interpolation) is performed in the next step S238 using pixels lying in the detected edge direction. More specifically, in this directional interpolation, a pixel value of a pixel located between the two pixels lying in the detected edge direction is interpolated from the pixel values of the two pixels lying in the detected edge direction.

This method makes it possible to interpolate the pixel while preserving the clearness and the contrast of the original image without causing the original image to be blurred, compared with the standard linear interpolation (step S242) in which the mean value of the pixel value at the center of an upper row and the pixel value at the center of a lower row is employed as a new pixel value for all cases.

Thereafter, in step S239, the vertical up sampler 13 performs a structure correction process. In this structure correction process, the relationship among a pixel interpolated at coordinates (X+N/2, Y) and vertically adjacent pixels, that is, pixels up_line(N/2) and down_line(N/2) is analyzed to check the consistency in terms of the created local structure (formed of the pixel created in the directional interpolation process in step S238 and the upper and lower pixels).

More specifically, in the structure correction process, the created pixel value is subtracted from the pixel value at the center of the upper row, and the pixel value at the center of the lower row is subtracted from the created pixel value. These two differences are multiplied with each other to obtain a value V(N/2) indicating the change in the vertical direction. That is, in step S239, calculation is performed in accordance with the following equation.

$$V(N/2)=(\text{up\_line}(N-2)-H\text{-buffer}(X+N/2,\ Y))\times(H\text{-buffer}(X+N/2,\ Y)-\text{down\_line}(N/2)) \quad (20)$$

Then in step S240, the vertical up sampler 13 determines, on the basis of the result of the calculation performed in step S239, whether consistency is achieved in the created local structure. This determination is based on whether or not the value V(N/2) calculated according to equation (20) is positive. If the value V(N/2) is positive, it is determined that the local structure has consistency. In this case, the process proceeds to step S241 and the pixel value created in the directional interpolation in step S238 is stored in the Yth row in the H buffer 31.

On the other hand, if it is determined in step S240 that the value V(N/2) is negative, it is determined that the local structure does not have consistency. That is, it is determined that the local edge direction has been incorrectly detected, and thus the pixel value created in step S238 is not adequate. In this case, it is determined that detection of the local edge direction is impossible, and the process proceeds to step S242. In step S242, as in the case where it is determined in step S236 that the local energy E(N) is smaller than the threshold value T, the standard linear interpolation is performed according to equation (18). That is, the mean value of the pixel value at the center of the upper row (up_line (N/2)) and the pixel value at the center of the lower row (down_line(N/2)) is employed as the pixel value of a new pixel(X+N/2, Y), between the upper and lower rows, in the H buffer 31.

Figure 37:
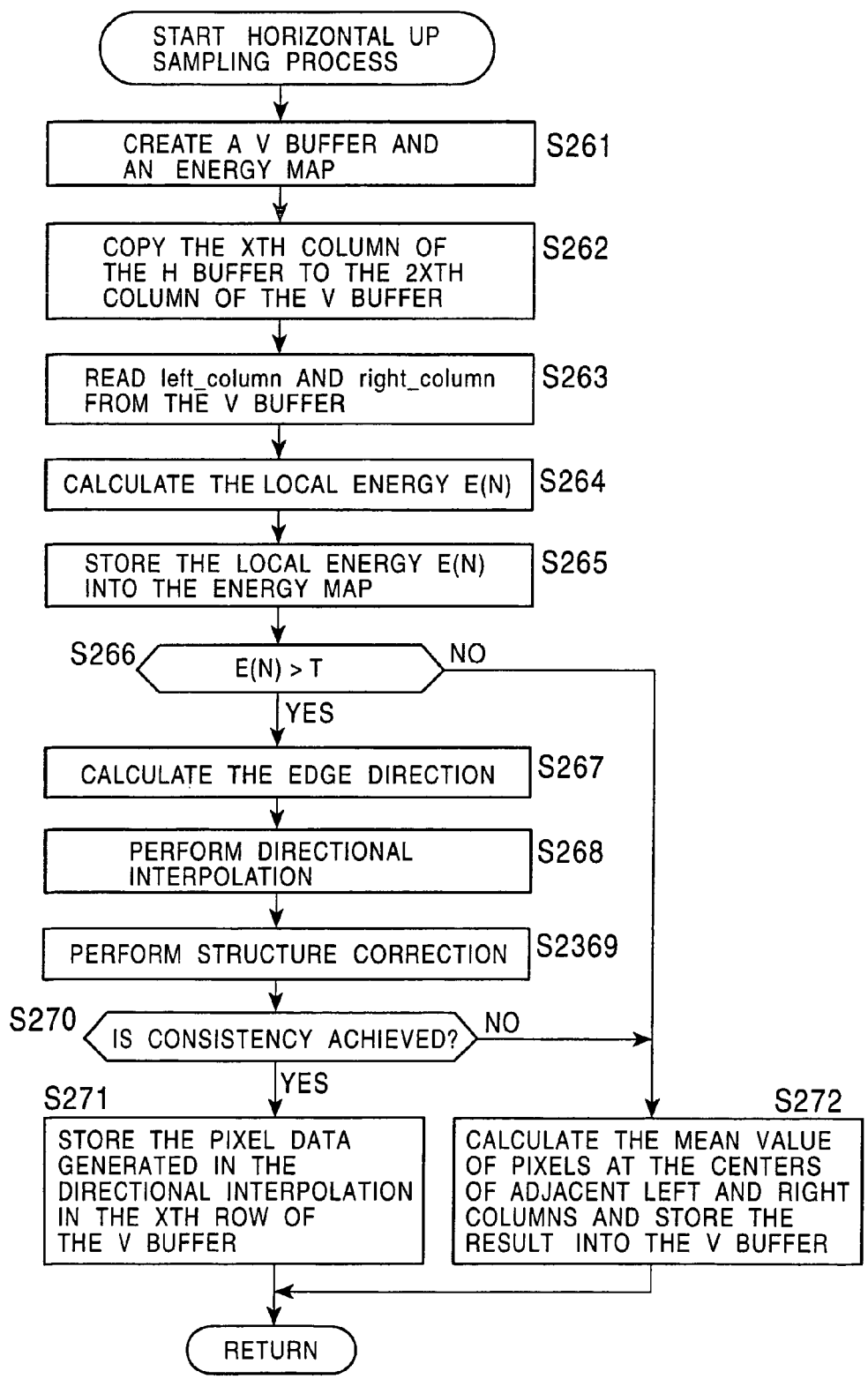
FIG. 37 is a flow chart illustrating the details of the horizontal up sampling process performed in step S214 in FIG. 34.

FIG. 37 illustrates the details of the horizontal up sampling process in step S214 in FIG. 34. This horizontal up sampling process is performed by the horizontal up sampler 15.

First, in step S261, a V buffer 51 is created. Herein, the V buffer 51 is created so as to have a size of 2×In_width×2×In_height. At the same time, an energy map with the same size as the V buffer 51 is also created. In step S262, the Xth column of the H buffer 31 is copied to the 2Xth column of the V buffer 51. Herein, the copying is performed for various values of X in the range greater than −1 and smaller than In_width.

In step S263, a left column (left_column) and a right column (right_column) are extracted from the H buffer 31. The coordinates of the center point of the left column (left_column) are given as (n, Y+N/2), and the coordinates of the center point of the right column (right_column) are given as (n+1, Y+N/2).

Then in step S264, the local energy E(N) is calculated by subtracting, from the pixel values of respective pixels in the left column (left_column), the pixel values of the corresponding pixels at diagonal locations in the right column (right_column) and then calculating the sum of the absolute values of the differences. That is, in this process, the local energy E(N) is calculated in accordance with the following equation.

$$E(N)=\Sigma_{I=0:N-1}ABS(\text{left\_column}(I)-\text{right\_column}(N-i-1)) \quad (21)$$

The calculated local energy E(N) is stored at coordinates (n, Y+N/2) in the energy map with a size of 2×In_width×In_height created in step S261.

Thereafter, in step S266, it is determined whether the energy E(N) is greater than a predetermined threshold value T. When the energy E(N) is equal to or smaller than the threshold value T, the area is regarded as a low-energy flat area including no edge. In this case, it is not needed to calculate the direction of a latent edge. Thus, the process proceeds to step S272 to perform linear interpolation in a standard manner. That is, the mean value of the pixel value at the center of the adjacent left column (left_column(N/2)) and the pixel value at the center of the adjacent right column (right_column(N/2)) is calculated and the resultant mean value is employed as the pixel value of a new pixel(X+N/2, Y).

$$V\text{-buffer}(X+N/2,\ Y)=0.5\times(\text{left\_column}(N/2)+\text{right\_column}(N/2)) \quad (22)$$

In the case where it is determined in step S266 that the energy E(N) is greater than the threshold value T, the area is regarded as a high-energy area including a latent edge. Thus, in this case, the process proceeds to step S267, and the direction of the edge is calculated in accordance with the following equation.

$$\text{Energy}=ABS(\text{left\_column}(N-x-1)-\text{right\_column}(x)) \quad (23)$$

The above calculation is performed repeatedly for various values of x such that the value of x is decremented from x=N−1 each time the calculation is performed until x becomes equal to or smaller than −1.

Of the energy values calculated, the lowest energy value is selected, and the line between the two pixels associated with the selected lowest energy value is regarded to indicate the direction of the edge in the local area.

In step S268, after determining the edge direction in step S267, a pixel is interpolated between the two pixels lying in the edge direction determined in step S267 by employing the mean value of the pixel values of these two pixels (that is, directional interpolation is performed). This makes it possible to perform interpolation while preserving the clearness and contrast of the original image without causing the image to be blurred which would occur in the standard line interpolation.

Thereafter, structure correction is performed in step S269. In this structure correction process, the relationship among a pixel interpolated at coordinates (X, Y+N/2) and pixels vertically adjacent that pixel, that is, pixels at coordinates left_column(N/2) and right column(N/2) in the V buffer 51 is analyzed to check the consistency in terms of the local structure. To this end, the pixel value at the center of the left column is subtracted from the interpolated pixel value and the pixel value at the center of the right column is subtracted from the interpolated pixel value, and these two differences are multiplied with each other to obtain a value H(N/2) indicating the change in the horizontal direction, as shown in the following equation.

$$H(N/2)=(\text{left\_column}(N/2)-V\text{-buffer}(X+N/2,\ Y))\times(V\text{-buffer}(X+N/2,\ Y)-\text{right\_column}(N/2)) \quad (24)$$

In step S270, it is determined, on the basis of the value H(N/2) calculated in step S269, whether consistency is achieved in the interpolated local structure. More specifically, the consistency is determined by checking whether the value H(N/2) is positive. In the case where the value H(N/2) is positive, the pixel value determined in step S268 by means of the directional interpolation is regarded as correct (consistent), and the pixel value is stored, in step S271, in the Xth row in the V buffer 51.

On the hand, if it is determined in step S270 that the value H(N/2) is negative (consistency is not achieved), that is, if it is determined that the pixel value created in step S268 by means of the directional interpolation is not adequate, the process proceeds to step S272 to perform linear interpolation in a standard manner as in the case where it is determined in step S266 that the energy E(N) is equal to or smaller than the threshold value T.

Figure 38:
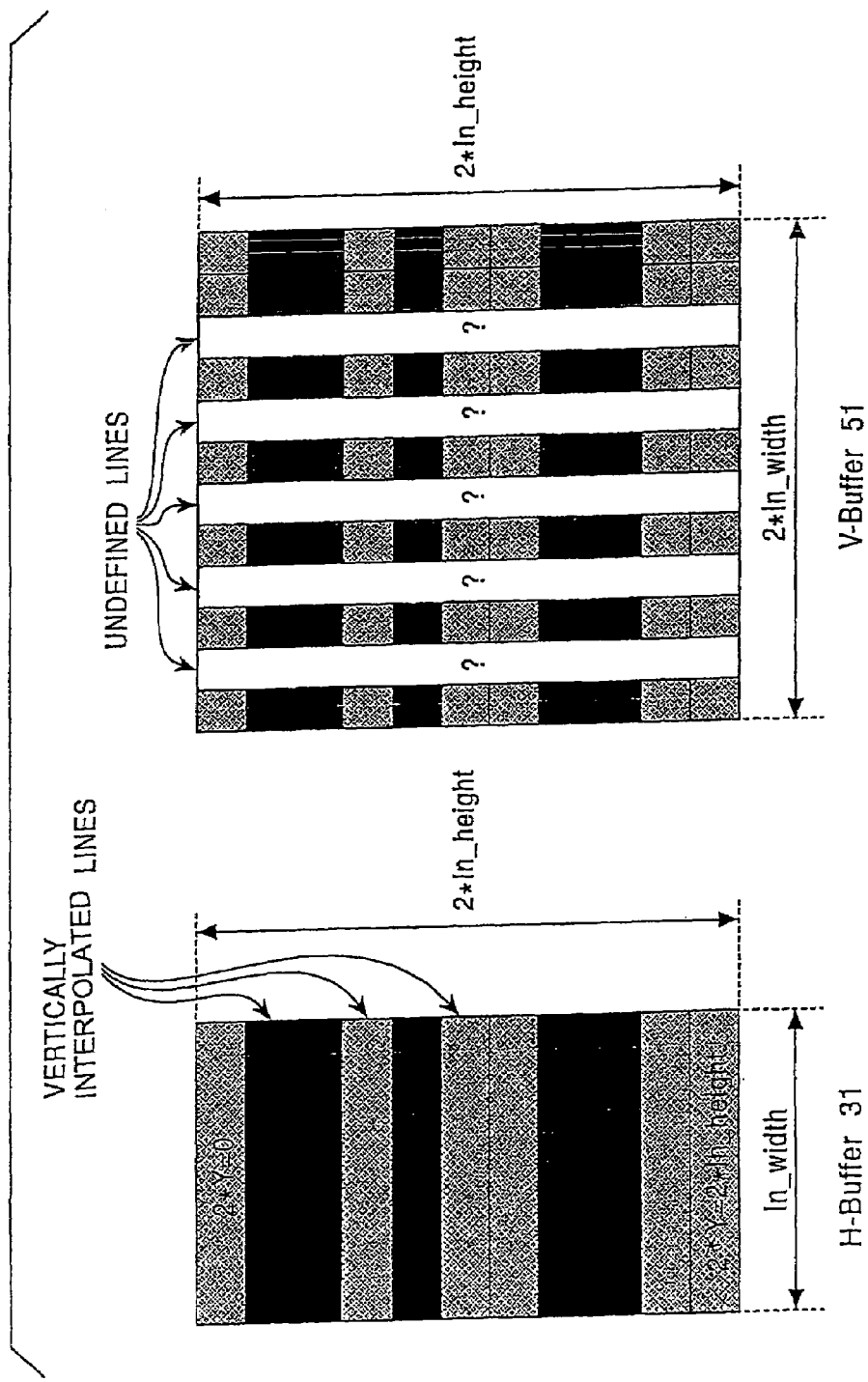
FIG. 38 is a diagram schematically illustrating the horizontal up sampling process shown in FIG. 37.

FIG. 38 illustrates the concepts of the horizontal up sampling process shown in FIG. 37. As shown in FIG. 38, the Xth column of the H buffer 31 is copied to the 2Xth column of the V buffer 51. Thereafter, new columns are interpolated between the adjacent columns.

By performing the process described above, it is possible to change the resolution of an image by an arbitrary scaling factor. For example, when it is desired to enlarge an image by a factor of 6, after performing the zooming process twice to obtain an image enlarged by a factor of 4, the high-speed zooming process may be performed to further enlarge the image by a factor of 3/2. Alternatively, the zooming process may be performed three times first to obtain an image enlarged by a factor of 8, and then the linear reduction may be performed to reduce the image by a factor 3/4.

In the zooming process or the high-speed zooming process described above, after an image is first enlarged in the vertical direction, the vertical (one-dimensional) edge building process is performed, and then the resultant image is further enlarged in the horizontal directly, and finally the horizontal (one-dimensional) edge building process is performed. Alternatively, after enlarging an image in both vertical and horizontal directions, the two-dimensional edge building process may be performed.

Figure 39:
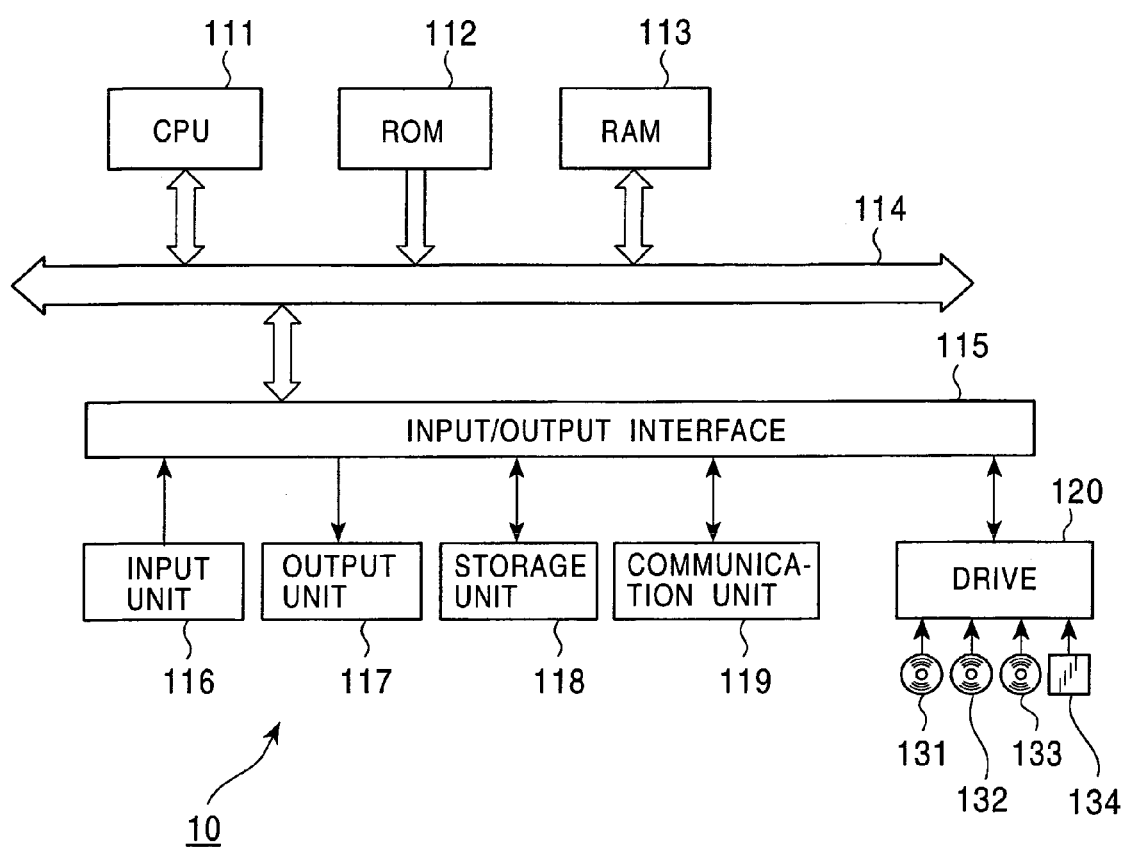
FIG. 39 is a block diagram illustrating an example of a hardware construction of the image processing apparatus shown in FIG. 1.

FIG. 39 illustrates an example of a hardware construction of the image processing apparatus 10 including functional blocks shown in FIG. 1. A CPU (Central Processing Unit) 111 executes various processes in accordance with a program stored in a ROM (Read Only Memory) 112 or a program loaded from a storage unit 118 into a RAM (Random Access Memory) 113. The RAM 113 is also used to store data which is used by the CPU 111 to execute various processes.

The CPU 111, the ROM 112, and the RAM 113 are connected to one another via a bus 114. An input/output interface 115 is also connected to the bus 114.

The input/output interface 115 is connected to an input device 116 including a keyboard and a mouse, an output device 117 including a loudspeaker and a display such as a CRT or a LCD, a storage unit 118 such as a hard disk, and a communication unit 119 such as a modem or a network adapter. The communication unit 119 serves to perform a communicating process via a network such as the Internet.

Furthermore, a drive 120 is connected to the input/output interface 115 as required. A magnetic disk 31, an optical disk 132, a magnetooptical disk 133, or a semiconductor memory 134 is mounted on the drive 120 as required, to install computer program therefrom into the storage unit 118.

The processing sequence described above may be executed by hardware or software. When the processing sequence is executed by software, a program forming the software may be installed from a storage medium onto a computer which is provided as dedicated hardware or may be installed onto a general-purpose computer capable of performing various processes in accordance with various programs installed thereon.

Specific examples of storage media usable for the above purpose include, as shown in FIG. 39, a magnetic disk 131 (such as a floppy disk), an optical disk 132 (such as a CD-ROM (Compact Disk-Read Only Memory) and a DVD (Digital Versatile Disk)), a magnetooptical disk 133 (such as a MD (Mini-Disk, trademark)), and a semiconductor memory 134, in the form of a package medium on which a program is stored and which is supplied to a user separately from a computer. A program may also be supplied to a user by preinstalling it on a built-in ROM 112 or a storage unit 118 such as a hard disk disposed in a computer.

In the present description, the steps described in the program stored in the storage medium may be performed either in time sequence in accordance with the order described in the program or in a parallel or separate fashion.

In the present description, the term "system" is used to represent an entire set of apparatuses.

As described above, in the image processing apparatus, the image processing method, and the program stored on the storage medium, according to the present invention, an edge direction is detected on the basis of local energy and pixels are interpolated on the basis of the detected edge direction, thereby making it possible to effectively change the resolution of a given image via a simple process which needs a small amount of calculation.

What is claimed is:

1. An image processing apparatus for converting the resolution of an original image in such a manner as to increase the spatial resolution of said original image by a factor of Z in each of vertical and horizontal directions, said image processing apparatus comprising:
   energy calculating means for calculating local energy of said original image based on two rows of pixels in said original image;
   detection means for detecting the direction of an edge based on said local energy calculated by said energy calculating means;
   interpolation means for interpolating a new pixel from a pixel of said original image based on the direction of the edge detected by said detection means;
   edge enhancement means for performing an edge enhancement process based on said local energy calculated by said energy calculating means; and
   consistency judging means for judging the consistency in terms of the local structure of the new pixel interpolated by said interpolation means, wherein said interpolation means performs linear interpolation to generate a second new pixel from two pixels lying along the detected direction of the edge when said consistency judging means determines that a value obtained by multiplying a first difference and a second difference is negative, wherein the first difference is obtained by subtracting the new pixel value from the pixel value of a pixel located at the center of the upper row, and wherein the second difference is obtained by subtracting the pixel value of a pixel located at the center of the lower row from the new pixel value.

2. The image processing apparatus according to claim 1, wherein said energy calculating means creates an energy map having a size corresponding to the size of said original image and calculates local energy of said original image by subtracting pixel values of pixels located in a right column of the original image from corresponding pixel values of pixels located in a left column of the original image, calculating an absolute value for each pixel value difference, and calculating a sum of the absolute values, wherein the pixels in the right column of the original image are diagonally spaced from the corresponding pixels in the left column of the original image.

3. The image processing apparatus according to claim 1, wherein said interpolation performed by said interpolation means is at least one of a first interpolation and second interpolation, and when the value of Z is equal to or greater than 2, said interpolation means performs the first interpolation and said edge enhancement means performs the edge enhancement, until Z is less than 2, and when the value of Z is smaller than 2 said interpolation means performs the second interpolation and said edge enhancement means performs the edge enhancement.

4. The image processing apparatus according to claim 1, wherein said energy calculating means creates an energy map based on the difference between pixel values obtained from pixels that are located diagonally from one another in said original image.

5. The image processing apparatus according to claim 1, further comprising edge conversion means for converting a loose connection of said original image into a tight connection before said energy calculating means calculates said local energy.

6. The image processing apparatus according to claim 5, wherein said edge conversion means replaces the value of a particular pixel with a mean value corresponding to the respective values of two pixels lying on a diagonal line.

7. The image processing apparatus according to claim 1, wherein when said calculated local energy is greater than a predetermined threshold value, said edge enhancement means performs a one-dimensional filtering process through a one-dimensional edge building filter such that the value of each pixel is multiplied by a corresponding coefficient of a plurality of coefficients and the products of each respective multiplication are added together, and wherein the one-dimensional edge building filter coefficients include a scaling factor.

8. The image processing apparatus according to claim 1, wherein said interpolation means and said edge enhancement means perform the interpolation and the edge enhancement upon said original image in each of vertical and horizontal directions.

9. The image processing apparatus according to claim 1, wherein said interpolation means interpolates one new pixel from two pixels lying along the detected direction of the edge.

10. The image processing apparatus according to claim 1, wherein said interpolation means performs linear interpolation when the edge is not detected by said detection means.

11. The image processing apparatus according to claim 1, wherein a parameter of said one-dimensional filtering process consists of said coefficients of a one dimensional edge building filter, and wherein the value of said coefficients is greater than 0.5, and less than 1.4.

12. An image processing method of converting the resolution of an original image in such a manner as to increase the spatial resolution of said original image by a factor of Z in each of vertical and horizontal directions, said image processing method comprising the steps of:

calculating local energy of said original image based on two rows of pixels in said original image;

detecting the direction of an edge based on said local energy calculated in said energy calculating step;

interpolating a new pixel from a pixel of said original image based on the direction of the edge detected in said detection step;

performing an edge enhancement process based on said local energy calculated in said energy calculating step;

judging the consistency in terms of the local structure of the new pixel interpolated by said interpolation means;

performing linear interpolation to generate a second new pixel from two pixels lying along the detected direction of the edge when the consistency judging determines that a value obtained by multiplying a first difference and a second difference is negative;

subtracting the new pixel value from the pixel value of a pixel located at the center of the upper row to obtain the first difference; and subtracting the pixel value of a pixel located at the center of the lower row from the new pixel value to obtain the second difference.

13. A computer-readable storage medium storing a computer-readable program for controlling an image processing apparatus to convert the resolution of an original image in such a manner as to increase the spatial resolution of said original image by a factor of Z in each of vertical and horizontal directions, said program comprising the steps of:

calculating local energy of said original image based on two rows of pixels in said original image;

detecting the direction of an edge based on said local energy calculated in said energy calculating step;

interpolating a new pixel from a pixel of said original image based on the direction of the edge detected in said detection step;

performing an edge enhancement process based on said local energy calculated in said energy calculating step;

judging the consistency in terms of the local structure of the new pixel interpolated by said interpolation means;

performing linear interpolation to generate a second new pixel from two pixels lying along the detected direction of the edge when the consistency judging determines that a value obtained by multiplying a first difference and a second difference is negative;

subtracting the new pixel value from the pixel value of a pixel located at the center of the upper row to obtain the first difference; and subtracting the pixel value of a pixel located at the center of the lower row from the new pixel value to obtain the second difference.

* * * * *